United States Patent
Abraham et al.

(10) Patent No.: US 10,021,554 B2
(45) Date of Patent: Jul. 10, 2018

(54) WIRELESS DISCOVERY LOCATION AND RANGING

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/542,433

(22) Filed: Nov. 14, 2014

(65) Prior Publication Data

US 2015/0139213 A1 May 21, 2015

Related U.S. Application Data

(60) Provisional application No. 61/905,807, filed on Nov. 18, 2013, provisional application No. 61/916,728, filed on Dec. 16, 2013.

(51) Int. Cl.
| | |
|---|---|
| *H04W 8/00* | (2009.01) |
| *H04W 76/14* | (2018.01) |
| *H04W 4/02* | (2018.01) |
| *H04W 76/23* | (2018.01) |
| *H04L 29/06* | (2006.01) |
| *H04L 29/08* | (2006.01) |
| *H04W 76/02* | (2009.01) |

(52) U.S. Cl.
CPC ............. *H04W 8/005* (2013.01); *H04L 69/28* (2013.01); *H04L 67/16* (2013.01); *H04W 4/023* (2013.01); *H04W 76/023* (2013.01); *H04W 76/14* (2018.02)

(58) Field of Classification Search
CPC combination set(s) only.
See application file for complete search history.

(56) References Cited

U.S. PATENT DOCUMENTS

| | | | | |
|---|---|---|---|---|
| 9,521,192 B2* | 12/2016 | Qi | .......................... | H04L 67/104 |
| 2010/0049435 A1* | 2/2010 | Li | .......................... | H04W 40/20 |
| | | | | 701/414 |
| 2010/0105409 A1* | 4/2010 | Agarwal | ............... | G01S 5/0263 |
| | | | | 455/456.1 |
| 2013/0250931 A1* | 9/2013 | Abraham | ............... | H04W 8/005 |
| | | | | 370/338 |

(Continued)

FOREIGN PATENT DOCUMENTS

WO WO-2013138499 A1 9/2013

OTHER PUBLICATIONS

International Search Report and Written Opinion—PCT/US2014/065949—ISA/EPO—dated Feb. 13, 2015.

*Primary Examiner* — Yee Lam
(74) *Attorney, Agent, or Firm* — Steven R. Thiel; Knobbe, Martens, Olson & Bear, LLP

(57) ABSTRACT

Systems and methods of wireless communication are described. One method includes transmitting an indication of a time window for determining a range for wireless communication between a first device and a second device. The method further includes determining the range between the first device and the second device at the indicated time window.

31 Claims, 20 Drawing Sheets

(56) References Cited

U.S. PATENT DOCUMENTS

| | | | | |
|---|---|---|---|---|
| 2013/0346207 | A1* | 12/2013 | Qi | G06Q 30/0267 |
| | | | | 705/14.64 |
| 2014/0162683 | A1* | 6/2014 | Rochberger | G01S 5/0236 |
| | | | | 455/456.1 |
| 2015/0087330 | A1* | 3/2015 | Prechner | G01S 5/14 |
| | | | | 455/456.1 |
| 2015/0094103 | A1* | 4/2015 | Wang | H04W 4/023 |
| | | | | 455/456.6 |
| 2016/0014565 | A1* | 1/2016 | Segev | H04W 4/025 |
| | | | | 455/456.1 |
| 2016/0044711 | A1* | 2/2016 | Lou | H04W 74/0816 |
| | | | | 370/338 |
| 2016/0127459 | A1* | 5/2016 | Qi | H04L 67/104 |
| | | | | 370/312 |
| 2016/0128113 | A1* | 5/2016 | Qi | H04W 76/023 |
| | | | | 370/329 |
| 2017/0111849 | A1* | 4/2017 | Park | H04W 76/10 |
| 2017/0156031 | A1* | 6/2017 | Segev | H04W 4/023 |

* cited by examiner

WIRELESS DISCOVERY LOCATION AND RANGING

CROSS-REFERENCE TO RELATED APPLICATIONS

This application claims the benefit of priority to U.S. Provisional Patent Application No. 61/905,807, entitled "WIRELESS DISCOVERY LOCATION AND RANGING" and filed Nov. 18, 2013, the entirety of which is incorporated herein by reference. This application also claims the benefit of priority to U.S. Provisional Patent Application No. 61/916,728, entitled "WIRELESS DISCOVERY LOCATION AND RANGING" and filed Dec. 16, 2013, the entirety of which is incorporated herein by reference.

FIELD

The present disclosure relates to discovery messages in wireless networks.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application, that can serve to access the Internet. As such, these wireless telephones can include significant computing capabilities.

In some communication systems, communications networks can serve to exchange messages among several interacting spatially-separated devices. Networks can be classified according to geographic scope, which may be, for example, a metropolitan area, a local area, or a personal area. Such networks can be designated respectively as a wide area network (WAN), a metropolitan area network (MAN), a local area network (LAN), a wireless local area network (WLAN), or a personal area network (PAN). Networks can also differ according to the switching/routing techniques used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks can be preferred when network elements are mobile and have dynamic connectivity needs or if the network architecture is formed in an ad hoc, rather than fixed, topology. Wireless networks can employ intangible physical media in an unguided propagation mode using electromagnetic waves in the radio, microwave, infra-red, optical, or other frequency bands. Wireless networks can advantageously facilitate user mobility and rapid field deployment when compared to fixed wired networks.

Devices in a wireless network can transmit/receive information between each other. The information can include packets. The packets can include overhead information (e.g., header information, packet properties, etc. that helps in routing the packets through the network) as well as data (e.g., user data, multimedia content, etc. in a payload of the packet). One type of packet, called a discovery packet, can serve to introduce two different devices communicating via a medium that is shared by multiple devices.

SUMMARY

Wireless networks are generally used as access mediums. For example, most wireless networks include an access point that facilitates communication between locally connected devices and an external network, such as the Internet. Nevertheless, as wireless devices become more common, networks can be formed for reasons other than to provide access to an external network. For example, when numerous wireless devices coexist in a fixed space (e.g., a stadium or a classroom), it can be useful for the wireless devices to communicate directly to each other (e.g., to share messages, multimedia, etc.). This type of ad hoc localized wireless networking can be referred to as "social Wi-Fi." However, the coexistence of many wireless devices in a relatively small area can lead to medium congestion. For example, in two adjacent classrooms in a school, where each classroom attempts to form its own social Wi-Fi network. Devices operating in one classroom may conflict or interfere with devices operating in the other classroom. In such a situation, it can be beneficial to predicate wireless discovery on inter-device distance, so that students in one classroom can communicate with each other without detecting messages between students in the other classroom.

Systems and methods of limiting wireless discovery range are disclosed. A device sending a discovery message can limit decoding of the discovery message to a receiving device that is within a particular discovery range threshold. When a wireless discovery range is limited, the discovery message can be considered "range adapted." For example, a device can adjust a transmit power and/or a modulation and coding scheme (MCS) of an outgoing discovery message such that the message is not (or cannot be) decoded outside the discovery range threshold. A receiving device can range adapt a discovery message by decoding or discarding the discovery message based on how far the receiving device is from the transmitting device. Decoding a discovery message can trigger additional actions at the receiving device, such as displaying data or navigating to a uniform resource locator (URL).

The techniques described herein can utilize various metrics to determine or estimate the distance between two devices, including, but not limited to, transmit power, MCS, received signal strength indication (RSSI), time elapsed between sending a range determination message (e.g., a request-to-send (RTS) message) and receiving a range determination response (e.g., a clear-to-send (CTS) message), and a location request/response exchange.

One aspect of the present disclosure provides a method of wireless communication. The method includes transmitting an indication of a time window for determining a range for wireless communication between a first device and a second device. The method further includes determining the range between the first device and the second device at the indicated time window.

In various embodiments, the method can further include exchanging one or more peer-to-peer data frames during the indicated time window based on a result of the range determination. In various embodiments, the first device comprises a publishing peer-to-peer device and the second device comprises a subscribing peer-to-peer device. In other various embodiments, the first device comprises a subscribing peer-to-peer device and the second device comprises a publishing peer-to-peer device. In other various embodiments, the indication further includes mandating the determining the range for a peer-to-peer service.

In other various embodiments, the range determination is at least based on a received signal strength indication of a received message, a transmit power level of the received message, a round trip time measurement between the first device and the second device, a location indication of the first device, a comparison of neighboring device lists associated with the first and second devices, or any combination thereof.

In other various embodiments, the location indication of the first device comprises location information comprising one or more of a location information type, a location coordinate indication derived based on a global-positioning-system, a cellular communication system, or a third-party location indication, a list of devices detectable by the first device, a list of received signal strength indications for devices detectable by the first device, and a list of round trip times for devices detectable by the first device. In other various embodiments, the indication further includes a channel identifier of the first device and further includes multiple time window intervals for determining the range for wireless communication between the first device and the second device. In such embodiments, the method may further include emitting a bitmap dividing beginnings of each of the multiple time window intervals into a plurality of consecutive time window intervals of equal durations, each bit of the bitmap identifying an availability of a respective indication of the time window.

In other various embodiments, the indication comprises availability for one or more of the first device and the second device to execute a timing measurement protocol. In other various embodiments, the method further includes determining whether a result of the range determination satisfies a criterion; and determining, when the result of the range determination does not satisfy the criterion, at least one additional ranges, wherein the at least one additional range is at least one of between the first device and the second device, and between the first device and one or more other devices.

In other various embodiments, the method further includes a process of triangulation and trilateration, the triangulation and trilateration process comprising: determining a range between: (1) the first device and a third device and (2) the first device and a fourth device; determining a range between: (3) the second device and the third device, (4) the second device and the fourth device, and (5) the third device and the fourth device; receiving, from each of the second, third, and fourth devices, respectively, a range between: (6) the second device and a fifth device, (7) the third device and the fifth device, and (8) the fourth device and the fifth device; and determining a range between the first device and the fifth device based on the range between the first device and the second device and each of the ranges (1)-(8).

Another aspect of the present disclosure includes an apparatus configured to communicate in a wireless network. The apparatus comprises a transmitter configured to transmit an indication of a time window for determining a range for wireless communication between the transmitter and a receiver. The apparatus further comprises a processor configured to determine the range between the transmitter and the receiver at the indicated time window. Various embodiments of the apparatus may also include the various embodiments described with respect to the method of wireless communication above except performed by the transmitter and/or processor of the apparatus.

Another aspect of the present disclosure includes a method of wireless communication. The method comprises receiving an indication of a time window for determining a range for wireless communication between a first device and a second device. The method further comprises initiating a range determination operation at the indicated time window.

In various embodiments, the method further comprises exchanging one or more peer-to-peer data frames during the indicated time window based on a result of the range determination operation. In other various embodiments, the first device comprises a publishing peer-to-peer device and the second device comprises a subscribing peer-to-peer device. In other various embodiments, the first device comprises a subscribing peer-to-peer device and the second device comprises a publishing peer-to-peer device. In other various embodiments, the indication further includes mandating the range determination operation for a peer-to-peer service.

In other various embodiments, the range determination operation is at least based on a received signal strength indication of a received message, a transmit power level of the received message, a round trip time measurement between the first device and the second device, a location indication of the first device, a comparison of neighboring device lists associated with the first and second devices, or any combination thereof. In certain or such embodiments, the location indication of the first device comprises location information comprising one or more of: a location information type, a location coordinate indication derived based on a global-positioning-system, a cellular communication system, or a third-party location indication, a list of devices detectable by the first device, a list of received signal strength indications for devices detectable by the first device, and a list of round trip times for devices detectable by the first device.

In other various embodiments, the indication further includes a channel identifier of the first device and further includes multiple time window intervals for performing the range determination operation between the first device and the second device. In such or other various embodiments, the method further comprises emitting a bitmap dividing beginnings of each of the multiple time window intervals into a plurality of consecutive time window intervals of equal durations, each bit of the bitmap identifying an availability of a respective indication of the time window.

In other various embodiments, the indication comprises availability for one or more of the first device and the second device to execute a timing measurement protocol. In other various embodiments, the method further comprises determining whether a result of the range determination operation satisfies a criterion; and initiating, when the result of the range determination does not satisfy the criterion, at least one additional range determination operation, wherein the at least one additional range determination operation is at least one of between the first device and the second device, and between the first device and one or more other devices.

Another aspect of the present disclosure includes an apparatus configured to communicate in a wireless network. The apparatus comprises a receiver configured to receive an indication of a time window for determining a range for wireless communication between the receiver and a transmitter. The apparatus further comprises a processor configured to initiate a range determination operation at the indicated time window. Various embodiments of the apparatus may also include the various embodiments described with respect to the method of wireless communication above except performed by the transmitter and/or processor of the apparatus.

DETAILED DESCRIPTION

Figure 1:
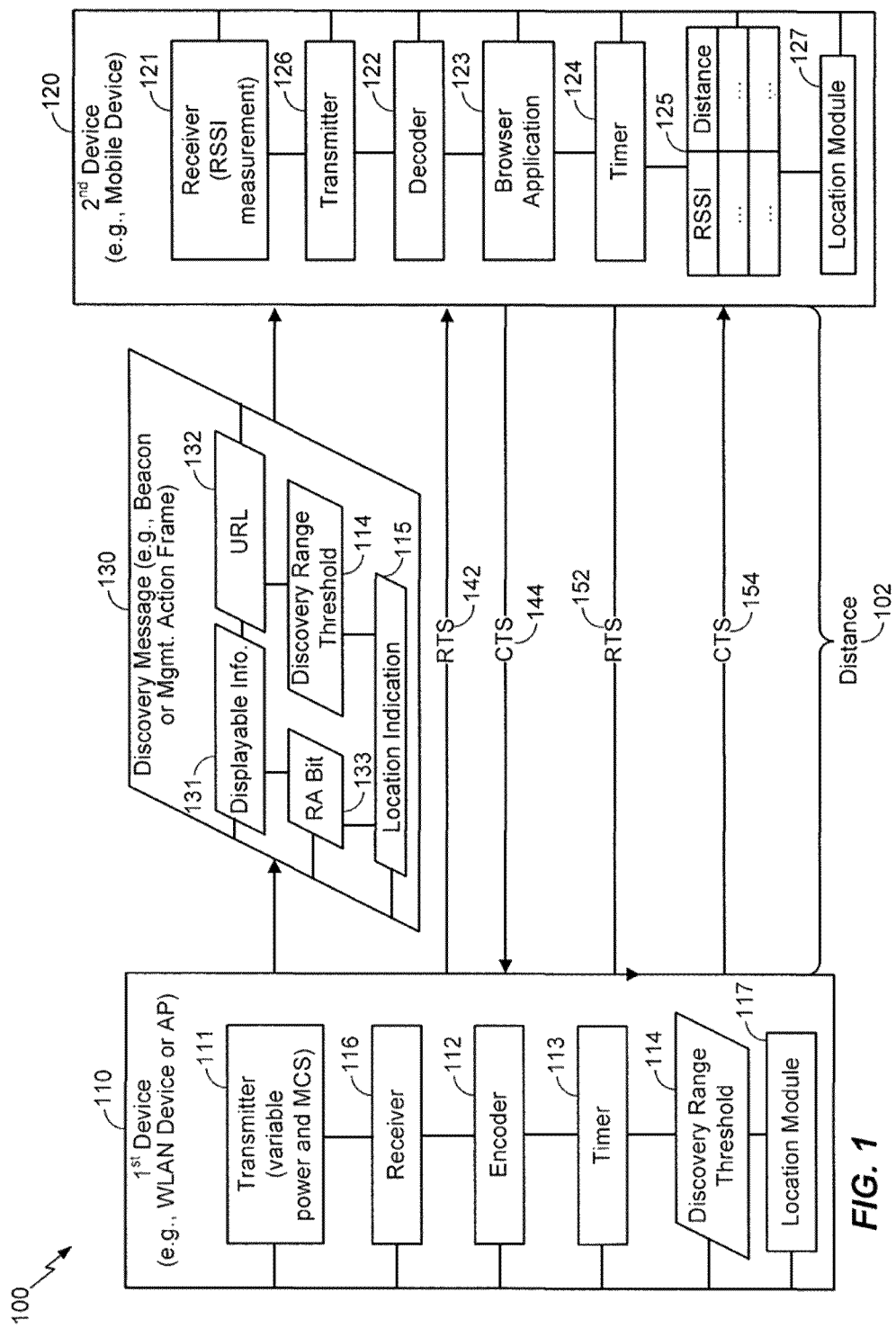
FIG. 1 is a diagram of a particular embodiment of a system that is operable to limit wireless discovery range.

FIG. 1 is a diagram of a particular embodiment of a system 100 that is operable to limit wireless discovery range. The system 100 can include a first device 110 and a second device 120 separated by a distance 102.

In a particular embodiment, the first device 110 can be a WLAN device, an access point (AP), or any combination thereof. The second device 120 can be a mobile device, such as a mobile telephone, a portable computing device, a tablet computing device, a personal digital assistant (PDA), a portable media player, or any combination thereof.

The first device 110 can include a transmitter 111 and a receiver 116. Although illustrated in FIG. 1 as single blocks, the transmitter 111 and the receiver 116 can each represent various hardware and/or software components used in transmitting and receiving wireless messages. The transmitter 111 can be configured to vary one or more transmission attributes of outgoing messages. For example, the transmitter 111 can vary transmit power and MCS for particular messages, such as a discovery message 130, a range determination message (e.g., an illustrative RTS message 142), and a range determination response (e.g., an illustrative CTS message 154). In a particular embodiment, the transmitter 111 and the receiver 116 can be integrated (e.g., into a transceiver).

The first device 110 can also include an encoder 112 configured to encode the discovery message 130 and a timer 113 (e.g., a hardware timer or a software timer). In a particular embodiment, the first device 110 can store a discovery range threshold 114. The discovery range threshold 114 can represent a distance outside of which devices receiving the discovery message 130 (e.g., the second device 120) will not or cannot decode the discovery message 130 (or at least a portion thereof). In a particular embodiment, the discovery message 130 can be an Institute of Electrical and Electronics Engineers (IEEE) beacon (or an information element (IE) thereof) or a management action frame that is broadcast periodically (e.g., every 100 milliseconds). Data encoded into the discovery message 130 can include displayable information 131 and/or a URL 132. When the discovery message 130 is decoded, the displayable information 131 can be automatically displayed by the decoding device and the URL 132 can be automatically navigated to by the decoding device.

In a particular embodiment, the discovery message 130 can also include a range adaptation (RA) bit 133. The range adaptation bit 133 can indicate whether or not range adaptation is to be performed for the discovery message 130. Thus, the range adaptation bit 133 can indicate whether the second device 120 is to decode the discovery message 130 from the first device 110 independent of whether the inter-device distance 102 between the first device 110 and the second device 120 is within the discovery range threshold 114. When the range adaptation bit 133 comprises a first value (e.g., zero), the discovery message 130 can be a range independent discovery message that is generally decoded. When the range adaptation bit 133 comprises a second value (e.g., one), the discovery message 130 can be a range adapted discovery message that is selectively decoded or discarded based on whether the distance 102 is within the discovery range threshold 114. In a particular embodiment, the first device 110 can include the discovery range threshold 114 in the discovery message 130, as shown.

In a particular embodiment, the discovery message 130 can also include a location indication 115. The first device 110 can include a location determination module 117 such as, for example, a GPS module, a visible-STA-tracking module, etc. The first device 110 can be configured to encode the indication of its location indication 115 in the discovery message, or in another message. Similarly, the second device 120 can include a location determination module 127 such as, for example, a GPS module, a visible-STA-tracking module, etc. The second device 120 can receive the location indication 115 from the first device 110, and can compare its own location (or an indication thereof) to the location indication 115 so as to determine a range to the first device 110 (or an indication thereof). The location indication 115 is further described with respect to FIGS. 12-15.

The second device 120 can include a transmitter 126 and/or a receiver 121. Although illustrated in FIG. 1 as single blocks, the transmitter 126 and the receiver 121 can each represent various hardware and/or software components used in transmitting and receiving wireless messages. The receiver 121 can be configured to measure one or more attributes of incoming messages. For example, the receiver 121 can measure a received signal strength indication (RSSI) of the discovery message 130. The transmitter 126 can be operable to send one or more messages to the first device 110, such as a range determination response (e.g., an illustrative CTS message 144) and a range determination message (e.g., an illustrative RTS message 152). In a particular embodiment, the transmitter 126 and the receiver 121 can be integrated (e.g., into a transceiver).

The second device 120 can also include a decoder 122 configured to decode the discovery message 130 and a timer 124 (e.g., a hardware timer or a software timer). The second device 120 can also include one or more applications, such as a browser application 123. In a particular embodiment, the browser application 123 can serve to navigate to the URL 132 included in the discovery message 130.

In one embodiment of operation, the first device 110 can limit wireless discovery range by varying a transmission attribute of the discovery message 130. For example, the first device 110 can elect to limit discovery range to the discovery range threshold 114. In one example, the discovery range threshold 114 may be three feet. In other examples, the discovery range threshold 114 may be any other distance. The discovery range threshold 114 can be set by the first device 110 or can be received from an external device (e.g., in a programming message). The transmitter 111 can adjust a transmit power and/or an MCS of the discovery message 130 based on the discovery range threshold 114. The adjusted transmit power and/or MCS can operate to limit decodability of the discovery message 130 outside the discovery range threshold 114. Thus, if the distance 102 is within the discovery range threshold 114 (e.g., less than or equal to 3 feet in one example), the second device 120 can decode the discovery message 130. Conversely, if the distance 102 is outside the discovery range threshold 114 (e.g., greater than 3 feet in one example), the second device 120 can discard or fail to decode the discovery message 130.

Alternately, the first device 110 can limit wireless discovery range by using the timer 113 to measure the distance 102. For example, the first device 110 can send a range determination message (e.g., the RTS message 142) to the second device 120 and can receive a range determination response (e.g., the CTS message 144), in accordance with an underlying wireless protocol (e.g., an IEEE 802.11 protocol). The timer 113 can be started upon sending the RTS message 142 and can be stopped upon receiving the CTS message 144. Based on the time elapsed, the first device 110 can estimate the distance 102. If the distance 102 is within the discovery range threshold 114, the first device 110 can send the discovery message 130 to the second device 120. The first device 110 can refrain from sending the discovery message 130 to the second device 120 if the distance 102 is outside the discovery range threshold 114. The use of RTS and CTS messages for range determination is provided for illustration purposes. Selected embodiments may use messages other than RTS and CTS messages. For example, a different message that solicits a response within a fixed interval of time to determine distance can be used. Additional examples of range determination messages and responses are further described herein.

When the transmit power or MCS of the discovery message 130 results in the second device 120 being unable to decode the discovery message 130, the second device 120 can discard the discovery message. However, in heterogeneous networks that include both range adapted and range independent discovery messages, varying transmission attributes of individual devices can be complex. In another embodiment of operation, the second device 120 can limit wireless discovery range based on attribute(s) of the received discovery message 130, even if the discovery message 130 is otherwise decodable. For example, the receiver 121 can measure a RSSI of the discovery message 130 and can determine the distance 102 based on the RSSI. In a particular embodiment, the distance 102 can be determined by searching for the determined RSSI in a table 125 stored at the second device 120, where the table 125 associates RSSI values to expected distances. The values in the table 125 can be specified by an industry standard, such as an IEEE standard. When the distance 102 is within the discovery range threshold 114, the decoder 122 can decode the discovery message 130. When the distance 102 is outside the discovery range threshold 114, the discovery message 130 can be discarded. The second device 120 can also range adapt the discovery message 130 based on a transmit power indicator included in the discovery message 130 and/or based on the MCS of the discovery message 130.

Alternately, the second device 120 can limit wireless discovery range by using the timer 124 to measure the distance 102. For example, the second device 120 can send the RTS message 152 to the first device 110 and can receive the CTS message 154 in response. The timer 124 can be started upon sending the RTS message 152 and can be stopped upon receiving the CTS message 154. Based on the time elapsed, the second device 120 can estimate the distance 102. If the distance 102 is within the discovery range threshold 114, the second device 120 can decode the discovery message 130. Otherwise, the second device 120 can discard the discovery message 130. The discovery message 130 can be received by the second device 120 prior to sending the RTS message 152 or can be received after receiving the CTS message 154.

When operating in a heterogeneous network, the second device 120 can treat each discovery message 130 independently. When the range adaptation bit 133 indicates that the discovery message 130 is range independent, the second device 120 can decode the discovery message 130 independent of whether its distance from the first device 110 is within the discovery range threshold 114. When the range adaptation bit 133 indicates that the discovery message 130 is range adapted, the second device 120 can selectively decode or discard the discovery message 130 based on whether or not its distance from the first device 110 is less than the discovery range threshold 114.

In a particular embodiment, the distance 102 can be stored at the first device 110 and/or the second device 120 for use in subsequent range adaptation operations. Alternately, or in addition, the distance 102 can be recalculated periodically or in response to detecting movement of the first device 110 and/or the second device 120.

In a particular embodiment, the system 100 of FIG. 1 can support range determination mechanisms other than RTS/CTS message exchange. To illustrate, a location request/response exchange can be used. In response to receiving a location request from a first device, a second device can determine and/or transmit its location to the first device. For example, the second device can determine its location via a global positioning system (GPS) module or transceiver included within or otherwise accessible to the second device. Alternately, the first device can request the location of the second device from a third device (e.g., a location database). In yet another example, the second device can request its location from the third device and can forward the received location to the first device.

In a particular embodiment, before or after receiving the discovery message 130, the second device 120 can request a location of the first device 110 and can receive a response indicating the location of the first device 110. The second device 120 can determine the distance 102 based on the location of the first device 110 and can selectively decode or discard the discovery message 130 based on whether the distance 102 is within the discovery range threshold 114. In another particular embodiment, the first device 110 can request the location of the second device 120 and can condition sending of the discovery message 130 to the second device 120 based on whether the location of the second device 120 is within the discovery range threshold 114.

The system 100 of FIG. 1 can thus enable limiting wireless discovery range by both transmitting devices (e.g., the first device 110) as well as receiving devices (e.g., the second device 120). The system 100 can also support heterogeneous networks in which one or more discovery messages are range limited while one or more other discovery messages are range independent. In addition, by packaging actionable data (e.g., the displayable information 131 or the URL 132) into the discovery message 130 instead of into a subsequent data message, the system 100 can leverage the discovery message 130 to introduce devices as well as communicate data between devices. This can enable data transfers that are simpler and faster than data transfers in existing wireless methods, which may involve complex handshake and security processes after discovery and prior to data exchange. Selective range adaptation may also enable user-friendly range-aware wireless services, as further described with respect to FIG. 2.

Figure 2:
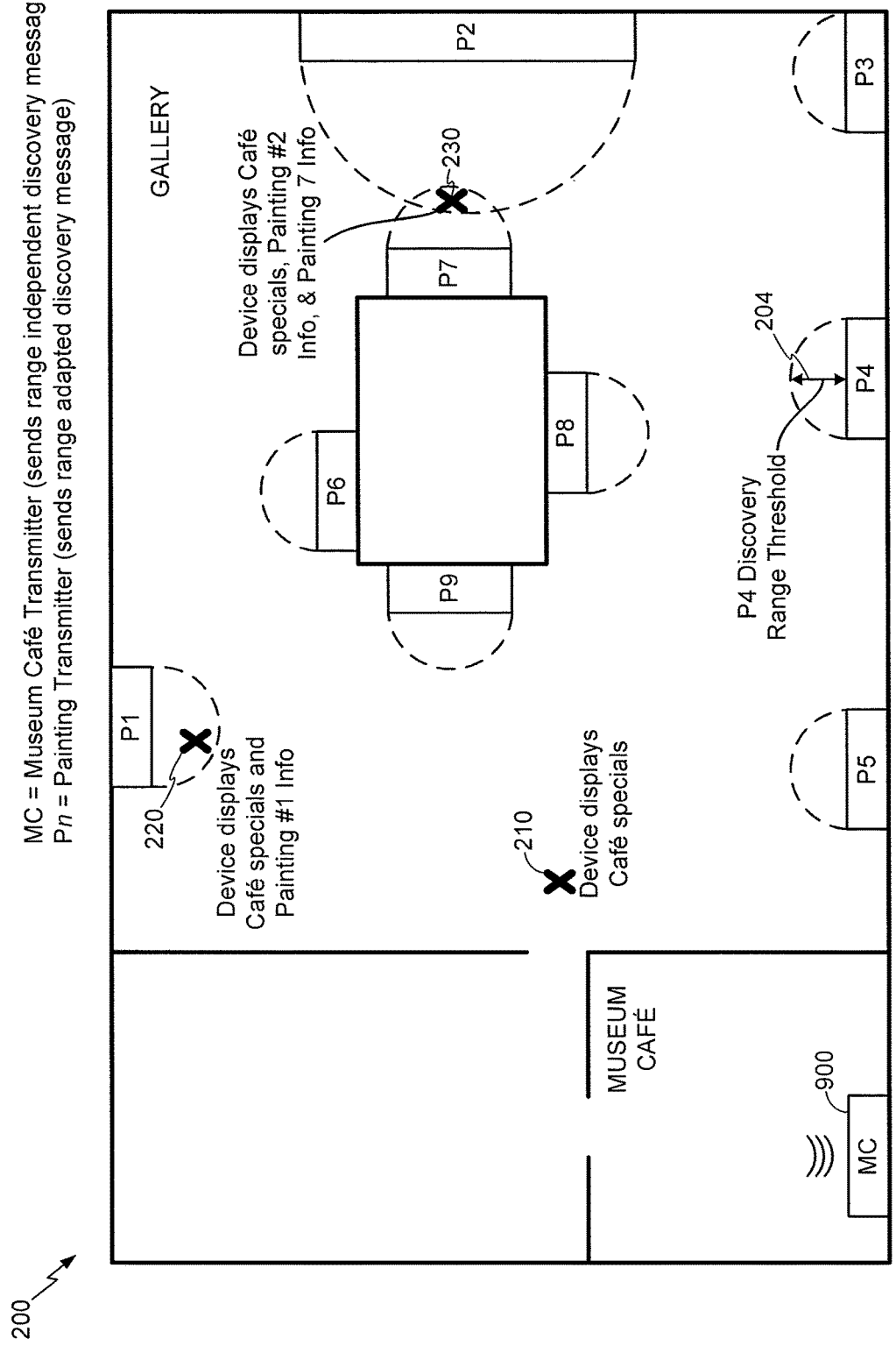
FIG. 2 is a diagram to illustrate an example of limiting wireless discovery range in a particular environment.

FIG. 2 is a diagram to illustrate a particular example of limiting wireless discovery range in a museum environment 200. The museum environment 200 is for illustration purposes. Limiting wireless discovery range in accordance with the techniques described herein can be performed in various other environments, e.g., a school, an apartment building, etc.

As illustrated in FIG. 2, the museum environment 200 includes a museum café and a gallery that includes various paintings P1-P9 on display. The museum café includes a wireless transmitter 900 (designated "MC"). The wireless transmitter 900 can transmit discovery messages that are range independent (e.g., have a range adaptation bit (e.g., the range adaptation bit 133 of FIG. 1) set to zero) and that include information associated with the museum café (e.g., daily specials or a URL of a café menu). Each of the paintings P1-P9 can also have associated wireless transmitters. In contrast to the wireless transmitter 900 of the museum café, the discovery messages transmitted by the painting transmitters may be range adapted. For example, each of the discovery messages transmitted by the painting transmitters may have a range adaptation bit set to one and can include a corresponding discovery range threshold (e.g., as described in relation to the discovery range threshold 114 of FIG. 1). To illustrate, the discovery range threshold for the painting "P4" is indicated at 204. Different paintings may have different discovery range thresholds. In the illustrated example, the discovery range threshold for the painting P2 is larger than the discovery range thresholds for the other paintings.

As a museum patron walks around the museum environment 200, a wireless device (e.g., a mobile phone) of the patron can display range-aware information. For example, the patron can download and execute a museum tour application on the wireless device. Depending on where the patron is located, the patron's wireless device can receive discovery messages from the various transmitters. The museum tour application on the wireless device can selectively decode or discard discovery messages as described with reference to FIG. 1.

For example, when the patron is at a first location 210, the patron's wireless device can decode the discovery message from, for example, the wireless transmitter 900 and can display, for example, café specials. Discovery messages received from any of the painting transmitters can be discarded, because the first location 210 is not within any of the corresponding discovery range thresholds of the paintings. When the patron is at a second location 220, the patron's wireless device can display the café specials and information for the painting P1. When the patron is in a third location 230, the patron's wireless device can display the café specials, information for the painting P2, and information for the painting P7. When multiple patrons and wireless devices are in the museum environment 200, each patron's wireless device can display selected information based on where that patron is located. Thus, the same discovery message can be decoded by one wireless device (e.g., that is within the corresponding discovery range threshold) but discarded by another wireless device (e.g., that is outside the corresponding discovery range threshold).

Limiting wireless discovery range as described herein can thus enable user-friendly range-aware wireless services, such as the museum information service described with reference to FIG. 2. Notably, such services can be implemented without the use of dedicated access points that facilitate device-to-device communication and Internet access. Instead, each transmitter (e.g., the wireless transmitter 900 (of the museum café) and the painting transmitters) can serve as an access point for an ad-hoc wireless network whose membership can be restricted by distance from the transmitter.

Figure 3:
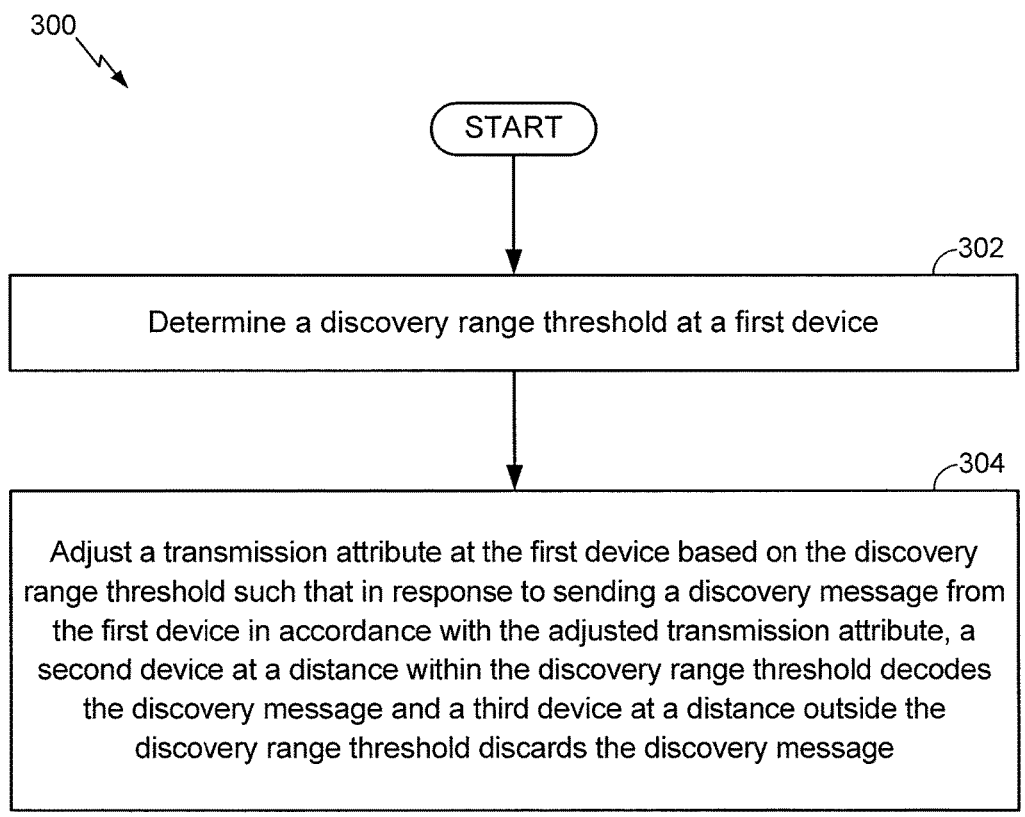
FIG. 3 is a flowchart of a particular embodiment of a method of limiting wireless discovery range at a transmitting device by adjusting a transmission attribute.

FIG. 3 is a flowchart of a particular embodiment of a method 300 of limiting wireless discovery range at a transmitting device by adjusting a transmission attribute. In an illustrative embodiment, the method 300 can be performed by the first device 110 of FIG. 1.

The method 300 can include determining a discovery range threshold at a first device, at 302. For example, in FIG. 1, the first device 110 can determine the discovery range threshold 114. The method 300 can also include adjusting a transmission attribute at the first device based on the discovery range threshold, at 304. The transmission attribute can be adjusted such that in response to sending a discovery message from the first device in accordance with the adjusted transmission attribute, a second device at a distance within the discovery range threshold decodes the discovery message. A third device at a distance outside the discovery range threshold discards the discovery message. For example, in FIG. 1, the first device 110 can adjust a transmission attribute (e.g., transmit power or MCS) of the discovery message 130 based on the discovery range threshold 114. When the distance 102 between the first device 110 and the second device 120 is within the discovery range threshold 114, the second device 120 can decode the discovery message 130. When the distance 102 is outside the discovery range threshold 114, the second device 120 (and/or a different third device not shown in FIG. 1) can discard the discovery message 130.

Figure 4:
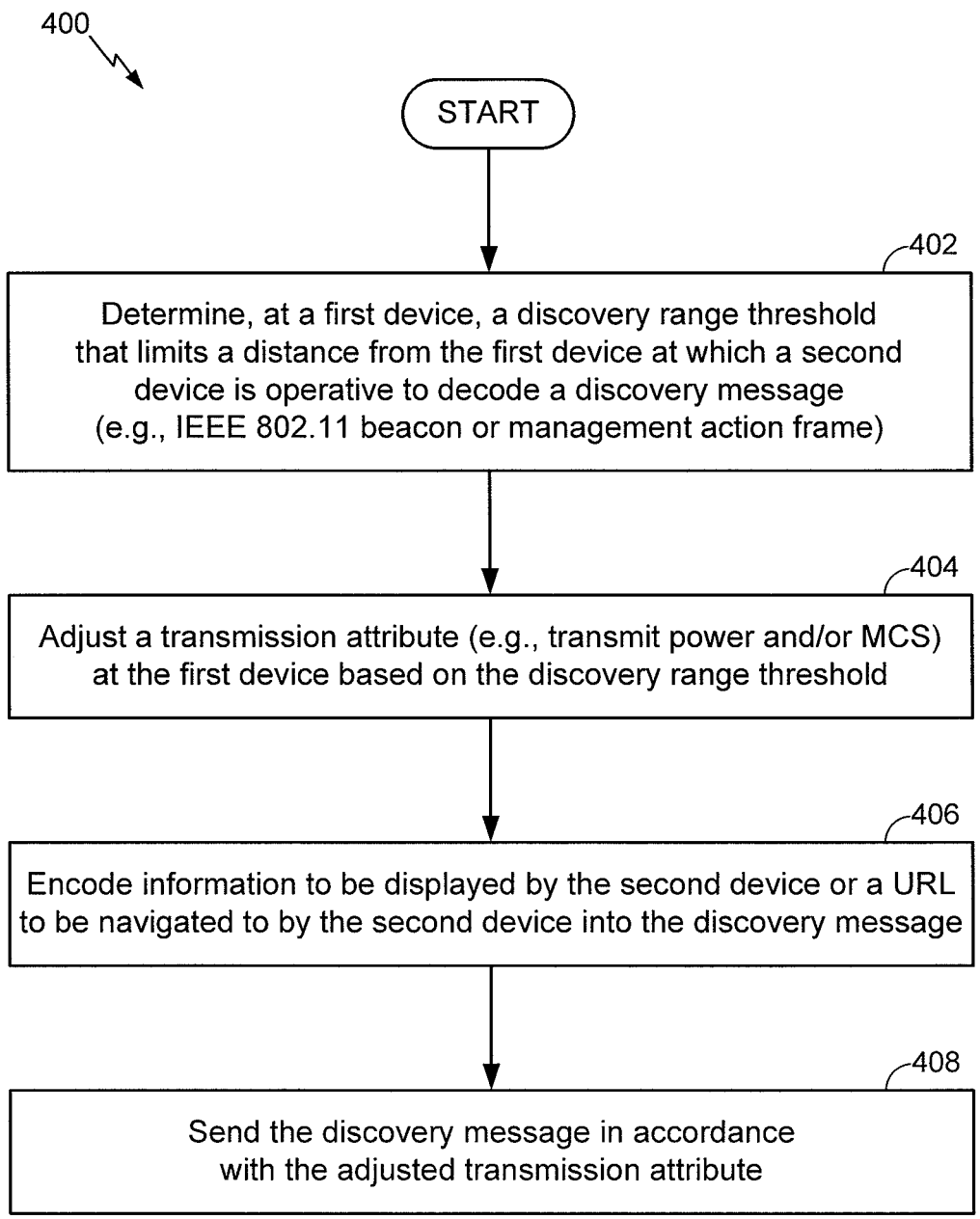
FIG. 4 is a flowchart of another particular embodiment of a method of limiting wireless discovery range at a transmitting device by adjusting a transmission attribute.

FIG. 4 is a flowchart of another particular embodiment of a method 400 of limiting wireless discovery range at a transmitting device by adjusting a transmission attribute. In an illustrative embodiment, the method 400 can be performed by the first device 110 of FIG. 1.

The method 400 can include determining, at a first device, a discovery range threshold that limits a distance from the first device at which a second device is operative to decode a discovery message, at 402. The discovery message can be an IEEE 802.11 beacon or a management action frame. For example, in FIG. 1, the first device 110 can determine the discovery range threshold 114.

The method 400 can also include adjusting a transmission attribute (e.g., transmit power and/or MCS) at the first device based on the discovery range threshold, at 404. The method 400 can further include encoding information to be displayed by the second device or a URL to be navigated to by the second device into the discovery message, at 406. For example, in FIG. 1, the encoder 112 can encode the displayable information 131 or the URL 132 into the discovery message 130.

The method 400 can include sending the discovery message in accordance with the adjusted transmission attribute, at 408. For example, in FIG. 1, the transmitter 111 can send (e.g., broadcast) the discovery message 130 using a transmit power level adjusted so that devices outside the discovery range threshold 114 do not decode the broadcast discovery message 130.

Figure 5:
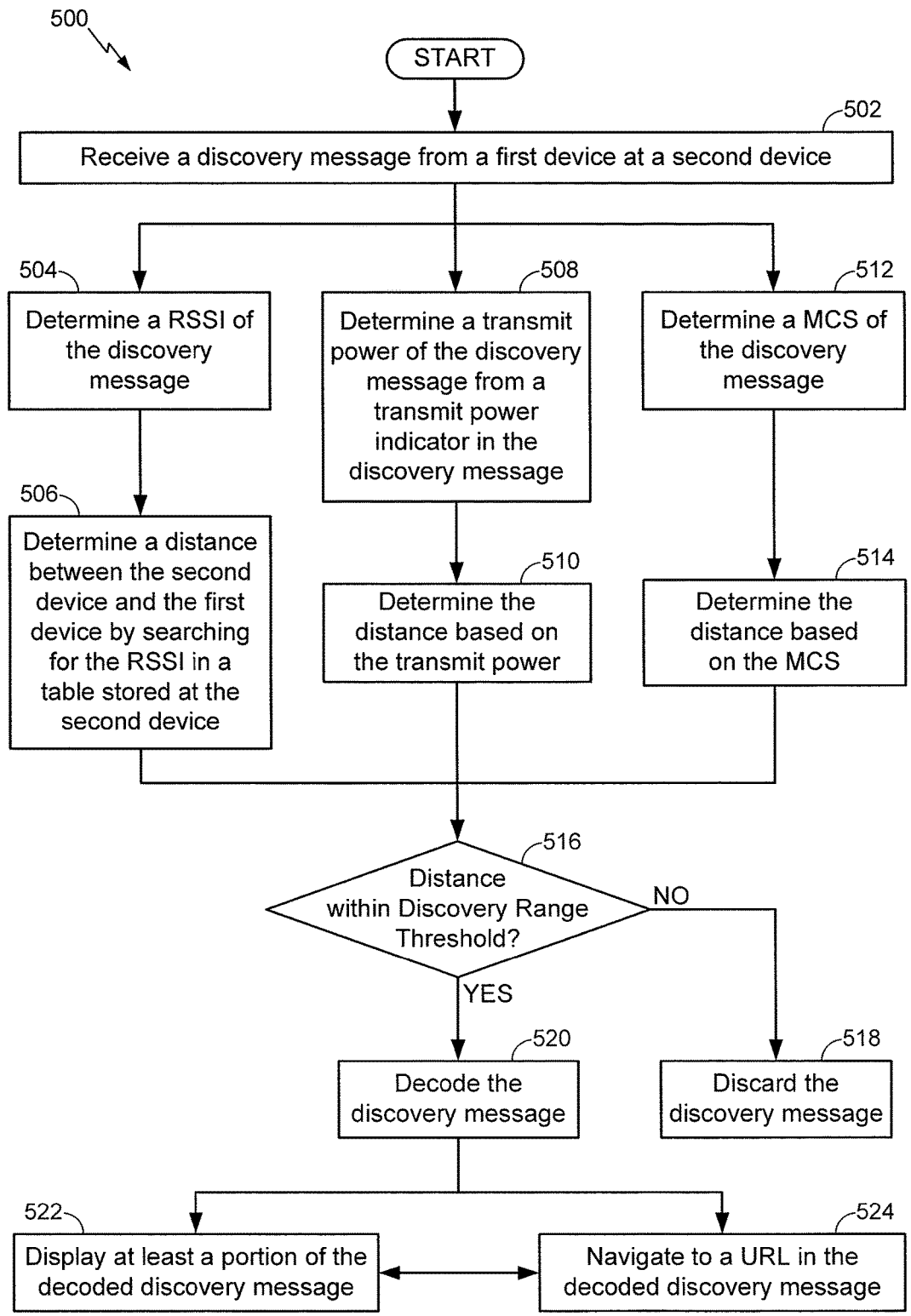
FIG. 5 is a flowchart of a particular embodiment of a method of limiting wireless discovery range at a receiving device based on an attribute of a received message.

FIG. 5 is a flowchart of a particular embodiment of a method 500 of limiting wireless discovery range at a receiving device based on an attribute of a received message. In an illustrative embodiment, the method 500 can be performed by the second device 120 of FIG. 1.

The method 500 can include receiving a discovery message from a first device at a second device, at 502. For example, in FIG. 1, the second device 120 can receive the discovery message 130 from the first device 110.

The method 500 can include determining a distance between the second device and the first device based on one or more attributes of the discovery message. To illustrate, a first implementation can include determining a RSSI of the discovery message, at 504, and determining the distance based on the RSSI, at 506. The distance can be determined by searching for the RSSI in a table stored at the second device. For example, in FIG. 1, the second device 120 can determine the distance 102 by searching the table 125. A second implementation can include determining a transmit power of the discovery message from a transmit power indicator in the discovery message, at 508, and determining the distance based on the transmit power, at 510. A third implementation can include determining a MCS of the discovery message, at 512, and determining the distance based on the MCS, at 514. For example, the distance can be determined based on whether the MCS is a "high data rate" MCS (implying a short distance between devices) or a "low data rate" MCS (implying a long distance between devices). A modulation scheme specified by the MCS can include binary phase-shift keying (BPSK), quadrature phase-shift keying (QPSK), 16-point quadrature amplitude modulation (16-QAM), or 64-point quadrature amplitude modulation (64-QAM). A coding rate specified by the MCS can include ½, ¾, ⅔, or ⅚.

The method 500 can include determining whether the distance is within a discovery range threshold, at 516. For example, in FIG. 1, the second device 120 can determine whether the distance 102 is within the discovery range threshold 114. When the distance is outside the discovery range threshold, the method 500 can include discarding the discovery message, at 518.

When the distance is within the discovery range threshold, the method 500 can include decoding the discovery message, at 520. The method 500 can also include displaying at least a portion of the discovery message, at 522, and/or navigating to a URL in the decoded discovery message, at 524. For example, in FIG. 1, the second device 120 can display the displayable information 131 and/or navigate to the URL 132 via the browser application 123.

Figure 6:
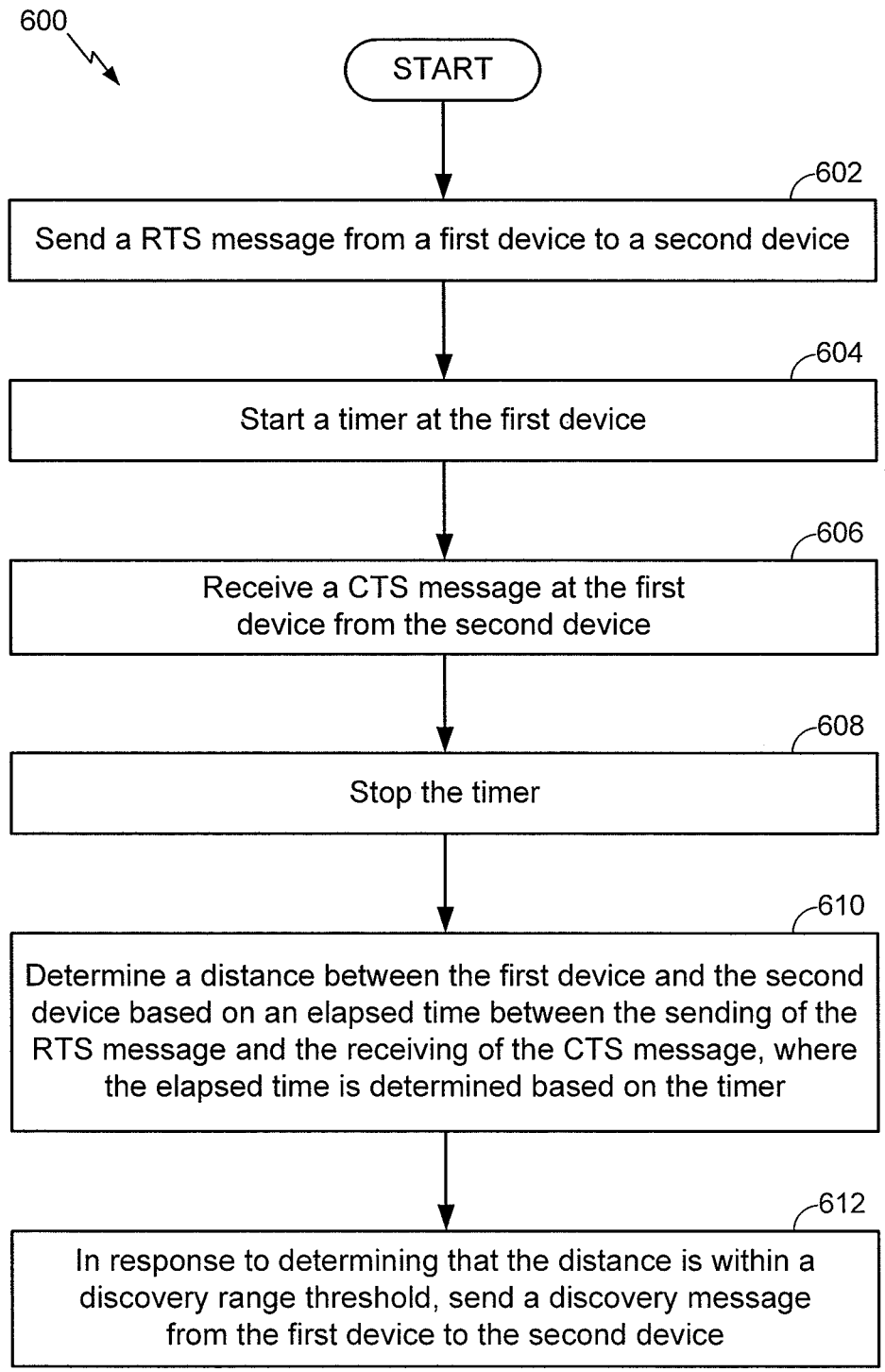
FIG. 6 is a flowchart of a particular embodiment of a method of limiting wireless discovery range at a device based on time elapsed between sending a RTS message and receiving a CTS message.

FIG. 6 is a flowchart of a particular embodiment of a method 600 of limiting wireless discovery range at a device based on time elapsed between sending a RTS message (e.g., the RTS message 142 of FIG. 1) and receiving a CTS message (e.g., the CTS message 144 of FIG. 1). In an illustrative embodiment, the method 600 can be performed by the first device 110 of FIG. 1.

The method 600 can include sending a RTS message from a first device to a second device, at 602, and starting a timer (e.g., the timer 113 of FIG. 1) at the first device, at 604. For example, in FIG. 1, the first device 110 can send the RTS message 142 and start the timer 113. The method 600 can also include receiving a CTS message at the first device from the second device, at 606, and stopping the timer, at 608. For example, in FIG. 1, the first device 110 can receive the CTS message 144 and stop the timer 113.

The method 600 can further include determining a distance (e.g., the distance 102 of FIG. 1) between the first device and the second device based on an elapsed time between the sending of the RTS message and the receiving of the CTS message, where the elapsed time is determined based on the timer, at 610. For example, in FIG. 1, the first device 110 can determine the distance 102 based on the timer 113.

The method 600 can include, in response to determining that the distance is within a discovery range threshold, sending a discovery message (e.g., the discovery message 130 of FIG. 1) from the first device to the second device, at 612. For example, in FIG. 1, the first device 110 can send the discovery message 130 to the second device 120 in response to determining that the distance 102 is within the discovery range threshold 114. If the distance is outside the discovery range threshold, the first device can refrain from sending the discovery message to the second device.

Figure 7:
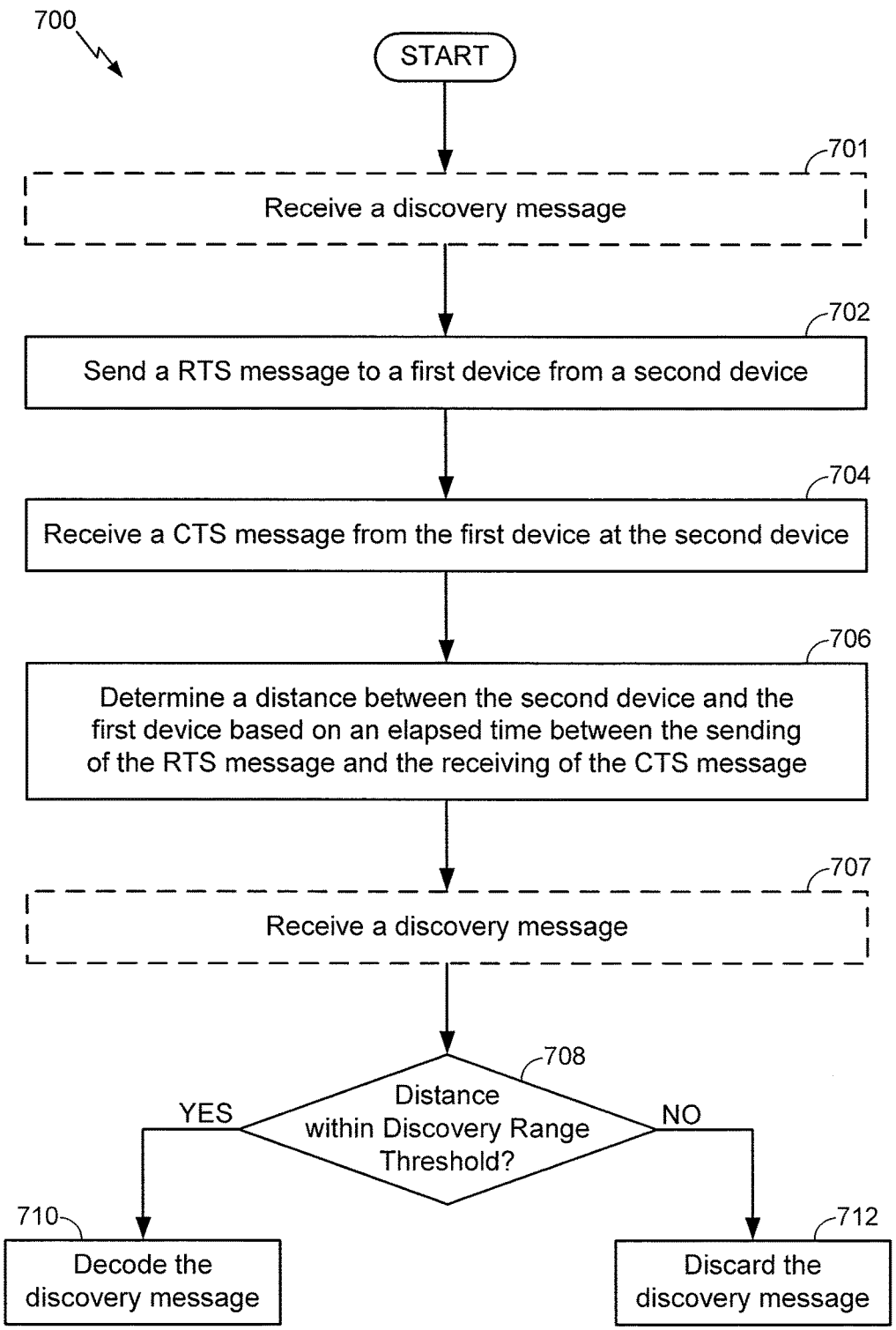
FIG. 7 is a flowchart of another particular embodiment of a method of limiting wireless discovery range at a device based on time elapsed between sending a RTS message and receiving a CTS message.

FIG. 7 is a flowchart of another particular embodiment of a method 700 of limiting wireless discovery range at a device based on time elapsed between sending a RTS message and receiving a CTS message. In an illustrative embodiment, the method 700 can be performed by the second device 120 of FIG. 1.

The method 700 can include sending a RTS message to a first device from a second device, at 702, and receiving a CTS message from the first device at the second device, at 704. For example, in FIG. 1, the second device 120 can send the RTS message 152 to the first device 110 and can receive the CTS message 154 in response.

The method 700 can also include determining a distance between the second device and the first device based on an elapsed time between the sending of the RTS message and the receiving of the CTS message, at 706. For example, in FIG. 1, the second device 120 can determine the distance 102. The method 700 can further include determining whether the distance 102 is within a discovery range threshold, at 708.

When the distance is within the discovery range threshold, the method 700 can include decoding a discovery message, at 710. In a particular embodiment, the discovery message can have been received, at 701, prior to sending the RTS message. Alternately, the discovery message can have been received, at 707, after receiving the CTS message. For example, in FIG. 1, the second device 120 can decode the discovery message 130 when the distance 102 is within the discovery range threshold 114.

When the distance is outside the discovery range threshold, the method 700 can include discarding the discovery message, at 712. For example, in FIG. 1, the second device 120 can discard the discovery message 130 when the distance 102 is outside the discovery range threshold 114.

Figure 8:
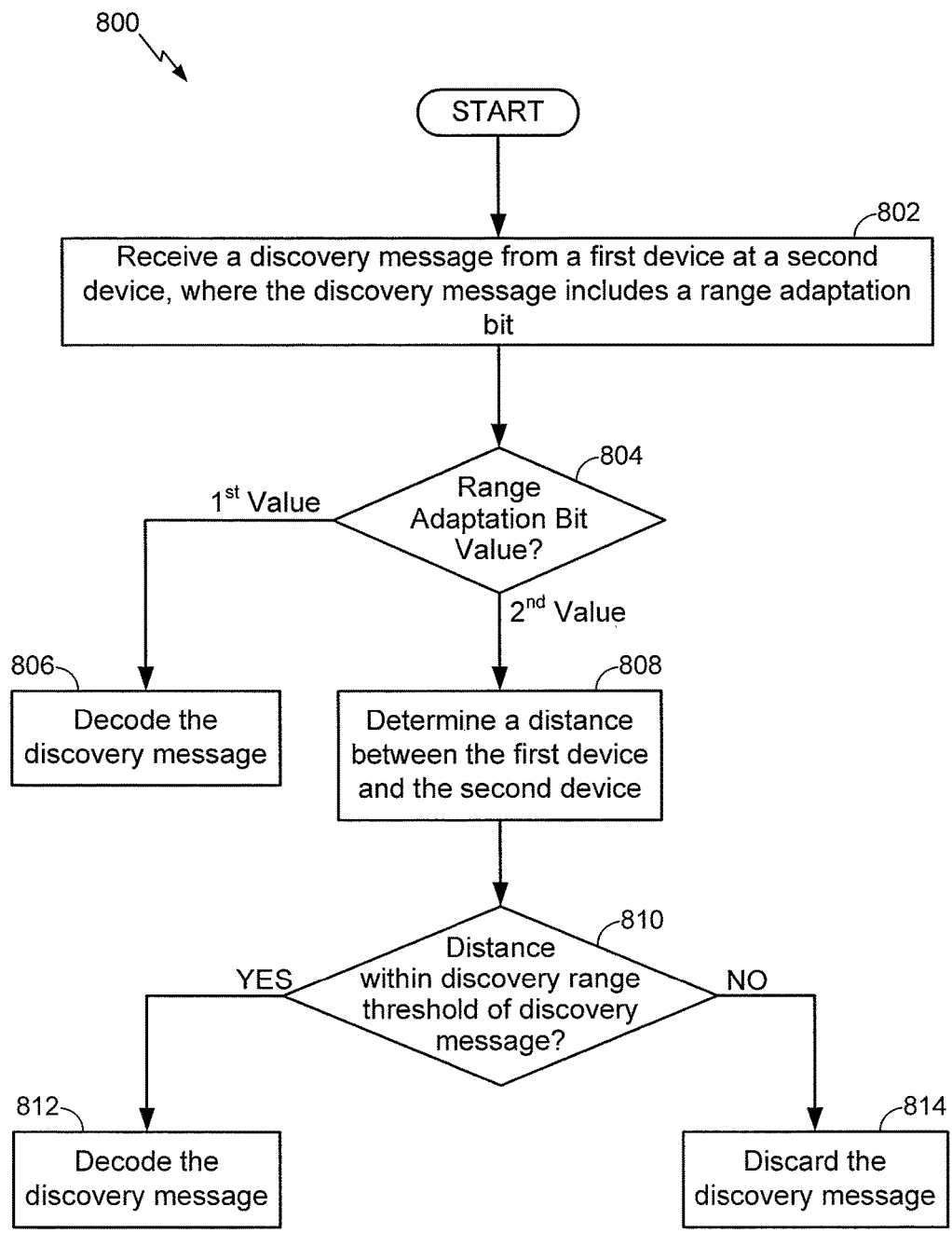
FIG. 8 is a flowchart of a particular embodiment of a method of operating a wireless device.

FIG. 8 is a flowchart of a particular embodiment of a method 800 of operating a wireless device. In an illustrative embodiment, the method 800 can be performed by the second device 120 of FIG. 1.

The method 800 can include receiving a discovery message from a first device at a second device, where the discovery message includes a range adaptation bit, at 802. For example, in FIG. 1, the second device 120 can receive the discovery message 130, where the discovery message 130 includes the range adaptation bit 133.

The method 800 can also include determining a value of the range adaptation bit, at 804. When the range adaptation bit comprises a first value, the method 800 can include decoding the discovery message, at 806. For example, in FIG. 1, when the range adaptation bit 133 comprises a first value (e.g., zero), the second device 120 can treat the discovery message 130 as range independent and can decode the discovery message 130.

When the range adaptation bit comprises a second value, the method 800 can include determining a distance between the first device and the second device, at 808. For example, in FIG. 1, when the range adaptation bit 133 comprises a second value (e.g., one), the second device 120 can treat the discovery message 130 as range adapted and can determine the distance 102. The method 800 can further include determining whether the distance is within a discovery range threshold of the discovery message, at 810. For example, in FIG. 1, the second device 120 can determine whether the distance 102 is within the discovery range threshold 114 included in or otherwise indicated by the discovery message 130.

When the distance is within the discovery range threshold, the method 800 can include decoding the discovery message, at 812. When the distance is outside the discovery range threshold, the method 800 can include discarding the discovery message, at 814. For example, in FIG. 1, the second device 120 can decode or discard the discovery message 130 based on whether the distance 102 is within the discovery range threshold 114.

Alternate embodiments of range determination can also be performed in accordance with the disclosure herein. For example, a service-providing device can receive a query message from a service-seeking device. The query message can include a request to set up a communication connection (e.g., a WiFi Direct connection) between devices, a request for information regarding services provided by a service-providing device, or some other message. In response to the query message, the service-providing device can determine a range.

In a particular embodiment, the service-providing device can determine the range based on an RSSI (e.g., by comparing the RSSI of the query message to a threshold). In another particular embodiment, the service-providing device can determine the range by initiating a round trip time (RTT) measurement operation (e.g., a RTS/CTS message exchange). RTT measurement can involve measuring a single message exchange or measuring multiple message exchanges (e.g., multiple RTS/CTS exchanges) and determining an average. In another particular embodiment, the service-providing device can use an alternate (e.g., non-802.11 based) technology, such as Bluetooth or near field communication (NFC), to determine the range. In another particular embodiment, the service-providing device can use GPS to determine the range, as described with reference to FIG. 1. In another particular embodiment, the service-providing device can perform range determination based on fixed wireless access points or cellular towers (e.g., via triangulation of device positions, as further described below). In another particular embodiment, the service-providing device can determine the range based on ranging (e.g., by triangulation) with respect to a third device (e.g., the service-providing device can indicate that a service-seeking device is to be within a particular distance from an AP to receive services). The choice of range determination mechanism can be performed by software executing at a device above a media access control (MAC) layer.

As an example, a first device ("Device X") can first determine a range between Device X and one or more other devices using the ranging methods as described above. For example, Device X may determine a range between Device X and three other devices ("Device A," "Device B," and "Device C"). In one embodiment, Device X may be a "new node," and Devices A, B, and C may be "existing nodes" or "neighboring nodes." For simplicity, the distance (as determined by the ranging) between Device X and Device A may be notated as D(A,X). Similarly, the distance between Device X and Device B may be notated as D(B,X), and the distance between Device X and Device C may be notated as D(C,X).

Then in this example, a new device ("Device Y") may be introduced. To determine a range between Device X and a new device (for example, "Device Y"), Device X may use any of the ranging methods as described above. However, as the number of devices (N) (e.g., in a cluster) for Device X to range increases, the ranging protocol overhead (O) may increase. For example, due to message exchanging requirements (e.g., at least 6 messages per device), the ranging protocol overhead may increase as $O*(N^2)$. Therefore, to reduce overhead, as described above, in one alternative method of ranging, the service-providing device can determine a range of one or more devices based on triangulation and/or trilateration methods. In one embodiment, such methods may be referred to as ranging with triangulation or ranging with triangulation for scalability.

As an example of ranging with triangulation, following the above example, Device X may first determine the three distances between Devices A, B, and C. For example, Device X may determine a distance between Device A and Device B (D(A,B)), a distance between Device A and Device C, (D(A,C)), and a distance between Device B and Device C (D(B,C)). In one embodiment, such distances may be determined by Devices A, B, and C, and then provided to Device X via messages between Device X and the Devices A, B, and C. Devices A, B, and C may then each determine a range from their own device to the new device, Device Y (e.g., D(A,Y), D(B,Y), and D(C,Y), respectively). In one embodiment, such determinations may take place entirely on Devices A, B, and C, respectively, such that the determinations do not use the resources of Device X. Devices A, B, and C may then provide Device X with their respective determinations via a message. In another embodiment, Devices A, B, and C may provide such determinations in a previous message or together in one message (e.g., at the same time as when Device X determines a distance between Device X and the respective Device A, B, or C, as described above).

Given the distances D(A,B), D(A,C), D(B,C), D(A,X), D(B,X), D(C,X), D(A,Y), D(B,Y), and D(C,Y), one skilled in the art will appreciate that Device X may then use triangulation and/or trilateration methods to determine a range between Device X and the new device, Device Y (e.g., D(X,Y)). Example information regarding trilateration methods may be found at http://inside.mines.edu/~whereman/papers/Murphy-Hereman-Trilateration-1995.pdf.

As one example algorithm for the trilateration methods described above, Device X may first initiate ranging with Device A. Device A may then execute a ranging protocol, for example, using round-trip time (RTT) estimation. Device A may then provide Device X with one or more (or all) of the distances it has recorded with respect to known neighboring devices. Device X may then repeat these steps with each of Devices B and C. In another embodiment, Device X may repeat these steps with additional devices, e.g., a Device D, a Device E, etc. Having determined these distances, Device X may then find "node sets," the members of each set including three of the Devices A, B, C, D, E, etc., for which mutual distances between members of the set are available. For example, as described above, one node set may include Devices A, B, and C. Using information provided by one or more of the node sets, Device X may then determine a distance between Device X and other devices/nodes (e.g., Device Y). For example, the node set including Devices A, B, and C may provide Device X with the distances D(A,Y), D(B,Y), and D(C,Y), such that Device X may then use trilateration methods to determine D(X,Y).

In response to determining that the range between the service-providing device (e.g., Device X) and the service-seeking device (via any of the methods as described above) is within a threshold, the service-providing device can initiate operations for connection setup (e.g., set up a WiFi Direct connection).

In an alternate embodiment, the roles of the service-providing and service-seeking device can be reversed. To illustrate, a service-seeking device can receive a discovery message from a service-providing device. In response to the discovery message, the service-seeking device can determine a range to the service-providing device. The range can be determined using an RSSI of the discovery message, a RTT measurement operation, an alternate (e.g., non-802.11 based) technology, GPS, fixed wireless access points or cellular towers, or ranging with respect to a third device. In response to determining that the range between the service-seeking device and the service-providing device is within a threshold, the service-seeking device can initiate operations for connection setup (e.g., set up of a WiFi Direct connection).

Thus, a message (e.g., a query message or a discovery message) can include data indicating whether a range determination mechanism is to be used to determine whether to perform an action in response to the message. To illustrate, a device can receive a message and can decode the received message or a portion thereof (e.g., a preamble or a header). The device can determine that the message includes data indicating that range determination is to be performed. In some embodiments, the message can identify the particular type(s) of range determination mechanism(s) (e.g., RSSI, RTT, GPS, alternate technology, etc.) to be used, as further described with reference to FIGS. 10-11. If range determination conditions are satisfied, the device can perform one or more actions (e.g., decode the rest of the received message, initiate connection setup, etc.).

The various range determination methods described herein can be combined. For example, a range determination hierarchy can include using RSSI as a gate keeping indicator. If the RSSI of a received message is lower than an RSSI threshold (e.g., indicating that the devices are separated by a distance that satisfies a first criterion), the range determination process can end. Conversely, if the RSSI of a received message satisfies the RSSI threshold (e.g., indicating that the devices are separated by a distance that is less than the first range threshold), the range determination process can continue and a more accurate range determination mechanism can be initiated (e.g., to determine whether the devices are within a second range threshold). For example, a next level of the range determination hierarchy can include initiating a RTT measurement process. Thus, the RTT measurement process, which can take longer (e.g., a few milliseconds) to perform than RSSI comparison, is not initiated for messages that correspond to a low RSSI (e.g., RSSI less than the RSSI threshold). As another example, the range determination hierarchy can involve using alternate technologies (e.g., Bluetooth, NFC, etc.) as a last resort, because use of such technologies can involve powering up circuitry that is in a sleep mode. In another particular embodiment, the range determination hierarchy can include prioritizing use of such alternate technology if available.

In a particular embodiment, in response to determining that a range determination mechanism is to be executed, a device (e.g., a service-providing device and/or a service-seeking device) can reserve a time period to execute the range determination mechanism. For example, the time period can be reserved using a discovery message. To illustrate, when a RTT measurement operation is to be performed, time can be reserved to perform frame exchanges (e.g., RTS/CTS frame exchanges).

Range determination may not merely be a one-time check to determine whether or not to perform an action in response to a discovery message or query message. For example, when a first device (e.g., a service-seeking device or a service-providing device) determines that range determination is to be performed, the first device can perform range determination multiple times to verify that the first device continues to remain within a range threshold of a second device (e.g., a service-providing device or a service-seeking device). To illustrate, such range determination can be performed continuously and/or periodically (e.g., by continuing to monitor RSSI, by performing periodic RTT measurements etc.). In a particular embodiment, discovery and/or query messages can include a transmit power indication to assist receiving devices in performing range determination as further described with respect to FIGS. 10-11.

Figure 9:
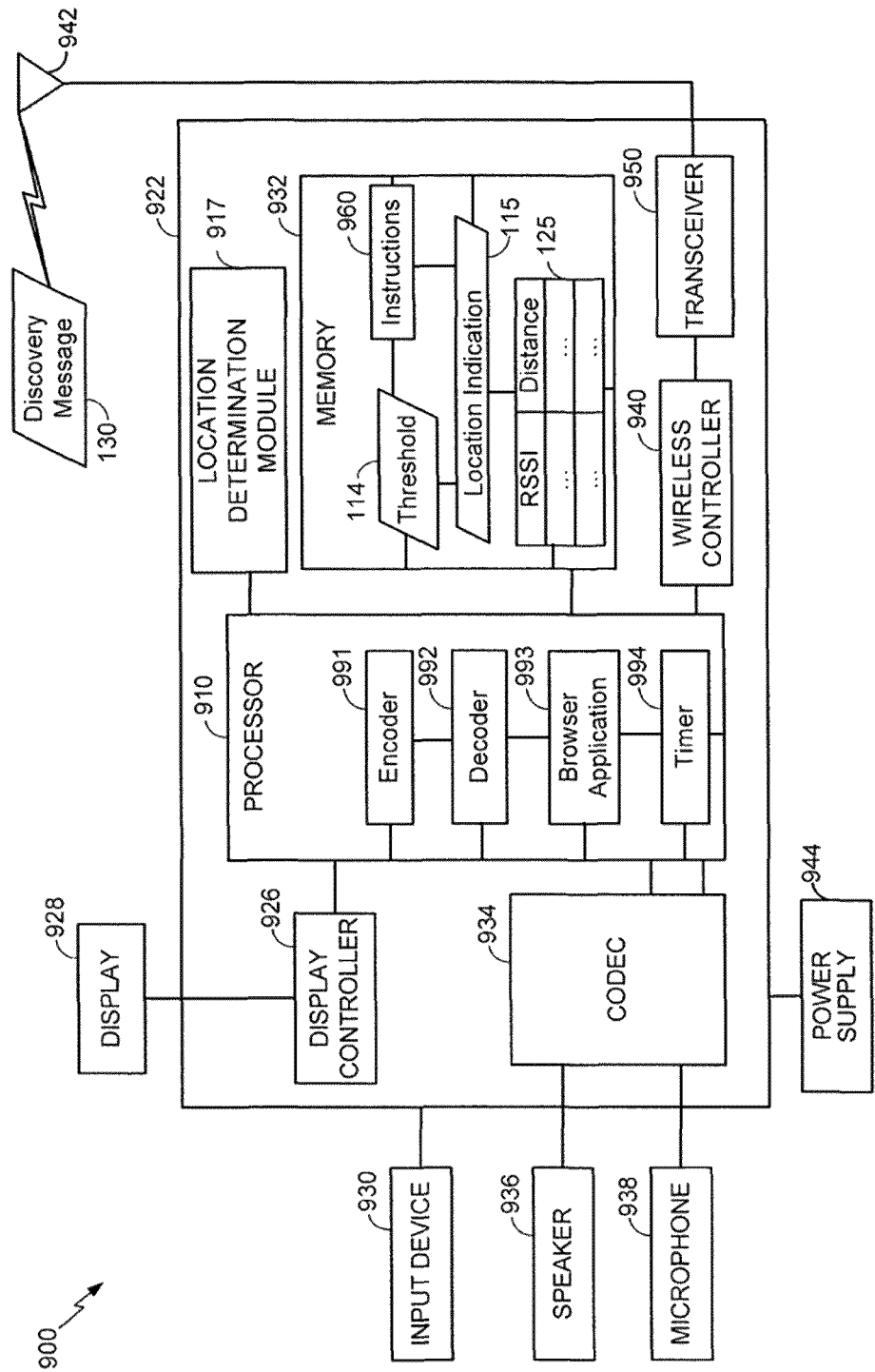
FIG. 9 is a block diagram of a mobile communication device including components that are operable to limit wireless discovery range.

FIG. 9 is a block diagram of a mobile communication device 900. In one embodiment, the mobile communication device 900, or components thereof, include or are included within the first device 110 FIG. 1, the second device 120 of FIG. 1, the museum transmitter 900 of FIG. 2, and/or the transmitters associated with the paintings "P1" to "P9" of FIG. 2. Further, all or part of the methods described in FIGS. 3-14 can be performed at or by the mobile communication device 900. The mobile communication device 900 includes a processor 910, such as a digital signal processor (DSP), coupled to a memory 932.

The memory 932 can be a non-transitory tangible computer-readable and/or processor-readable storage device that stores instructions 960. The instructions 960 can be executable by the processor 910 to perform one or more functions or methods described herein, such as the methods described with reference to FIGS. 3-14. The memory 932 can also store the discovery range threshold 114 and the table 125 associating RSSI values to expected distances.

The processor 910 can also include, implement, or execute device components described with reference to FIG. 1. For example, the processor 910 can include an encoder 991 (e.g., the encoder 112 of FIG. 1), can include a decoder 992 (e.g., the decoder 122 of FIG. 1), can execute a browser application 993 (e.g., the browser application 123 of FIG. 1, and/or can start and stop a timer 994 (e.g., the timer 113 or the timer 124 of FIG. 1).

FIG. 9 also shows a display controller 926 that is coupled to the processor 910 and to a display 928. For example, the display 928 can display information included in the discovery message 130, as described with reference to the displayable information 131 of FIG. 1. The display 928 can also display the results of navigating to a URL included in the discovery message 130, as described with reference to the URL 132 of FIG. 1.

A coder/decoder (CODEC) 934 can also be coupled to the processor 910. A speaker 936 and a microphone 938 can be coupled to the CODEC 934. FIG. 9 also indicates that a wireless controller 940 can be coupled to the processor 910, where the wireless controller 940 is in communication with an antenna 942 via a transceiver 950. The wireless controller 940, the transceiver 950, and the antenna 942 can thus represent a wireless interface that enables wireless communication by the mobile communication device 900. For example, such a wireless interface can serve to send or receive the discovery message 130. The mobile communication device 900 can include numerous wireless interfaces, where different wireless networks are configured to support different networking technologies or combinations of networking technologies.

In a particular embodiment, the processor 910, the display controller 926, the memory 932, the CODEC 934, the wireless controller 940, and the transceiver 950 are included in a system-in-package or system-on-chip device 922. In a particular embodiment, an input device 930 and a power supply 944 are coupled to the system-on-chip device 922. Moreover, in a particular embodiment, as illustrated in FIG. 9, the display 928, the input device 930, the speaker 936, the microphone 938, the antenna 942, and the power supply 944 are external to the system-on-chip device 922. However, each of the display 928, the input device 930, the speaker 936, the microphone 938, the antenna 942, and the power supply 944 can be coupled to a component of the system-on-chip device 922, such as an interface or a controller.

In conjunction with the described embodiments, an apparatus can include means for determining, at a first device, a discovery range threshold that limits a distance at which a second device is operative to decode a discovery message from the first device. For example, the means for determining can include a component of the first device 110 of FIG. 1 (e.g., a processor), one or more components of the mobile communication device 900 of FIG. 9, one or more other devices configured to determine a discovery range threshold, or any combination thereof. The apparatus can also include means for adjusting a transmission attribute at the first device based on the discovery range threshold. For example, the means for adjusting can include the transmitter 111 of FIG. 1, one or more components of the mobile communication device 900 of FIG. 9, one or more other devices configured to adjust a transmission attribute, or any combination thereof. The apparatus can further include means for sending the discovery message in accordance with the adjusted transmission attribute. For example, the means for sending can include the transmitter 111 of FIG. 1, one or more components of the mobile communication device 900 of FIG. 9, one or more other devices configured to send a message, or any combination thereof.

In another aspect, an apparatus can include means for receiving a discovery message from a first device at a second device. For example, the means for receiving can include the receiver 121 of FIG. 1, one or more components of the mobile communication device 900 of FIG. 9, one or more other devices configured to receive a message, or any combination thereof. The apparatus can also include means for determining a distance between the second device and the first device based on at least one attribute of the discovery message. For example, the means for determining can include a component of the second device 120 of FIG. 1 (e.g., a processor), one or more components of the mobile communication device 900 of FIG. 9, one or more other devices configured to determine a distance, or any combination thereof. The apparatus can further include means for decoding the discovery message when the distance is within a discovery range threshold. For example, the means for decoding can include the decoder 122 of FIG. 1, one or more components of the mobile communication device 900 of FIG. 9, one or more other devices configured to decode a message, or any combination thereof. The apparatus can include means for discarding the discovery message when the distance is outside the discovery range threshold. For example, the means for discarding can include a component of the second device 120 of FIG. 1 (e.g., a processor), one or more components of the mobile communication device 900 of FIG. 9, one or more other devices configured to discard a message, or any combination thereof.

In another aspect, an apparatus can include means for sending a range determination message from a first device to a second device. For example, the means for sending can include the transmitter 111 of FIG. 1, one or more components of the mobile communication device 900 of FIG. 9, one or more other devices configured to send a message, or any combination thereof. The apparatus can also include means for receiving a range determination response at the first device from the second device. For example, the means for receiving can include the receiver 116 of FIG. 1, one or more components of the mobile communication device 900 of FIG. 9, one or more other devices configured to receive a message, or any combination thereof. The apparatus can further include means for determining a distance between the first device and the second device based on an elapsed time between the sending of the range determination message and the receiving of the range determination response. For example, the means for determining can include the timer 113, another component of the first device 110 of FIG. 1 (e.g., a processor), one or more components of the mobile communication device 900 of FIG. 9, one or more other devices configured to determine a distance based on an elapsed time, or any combination thereof. The apparatus can include means for sending a discovery message from the first device to the second device in response to determining that the distance is within a discovery range threshold. For example, the means for sending can include the transmitter 111 of FIG. 1, one or more components of the mobile communication device 900 of FIG. 9, one or more other devices configured to send a message, or any combination thereof.

In another aspect, an apparatus can include means for sending a range determination message to a first device from a second device. For example, the means for sending can include the transmitter 126 of FIG. 1, one or more components of the mobile communication device 900 of FIG. 9, one or more other devices configured to send a message, or any combination thereof. The apparatus can also include means for receiving a range determination response from the first device at the second device. For example, the means for receiving can include the receiver 121 of FIG. 1, one or more components of the mobile communication device 900 of FIG. 9, one or more other devices configured to receive a message, or any combination thereof. The apparatus can further include means for determining a distance between the second device and the first device based on an elapsed time between the sending of the range determination message and the receiving of the range determination response. For example, the means for determining can include a component of the second device 120 of FIG. 1 (e.g., a processor), one or more components of the mobile communication device 900 of FIG. 9, one or more other devices configured to determine a distance, or any combination thereof. The apparatus can include means for decoding a discovery message received from the first device when the distance is within a discovery range threshold. For example, the means for decoding can include the decoder 122 of FIG. 1, one or more components of the mobile communication device 900 of FIG. 9, one or more other devices configured to decode a message, or any combination thereof. The apparatus can also include means for discarding the discovery message received from the first device when the distance is outside the discovery range threshold. For example, the means for discarding can include a component of the second device 120 of FIG. 1 (e.g., a processor), one or more components of the mobile communication device 900 of FIG. 9, one or more other devices configured to discard a message, or any combination thereof.

In another aspect, an apparatus can include means for determining a discovery range threshold at a first device. For example, the means for determining can include a component of the first device 110 of FIG. 1 (e.g., a processor), one or more components of the mobile communication device 900 of FIG. 9, one or more other devices configured to determine a discovery range threshold, or any combination thereof. The apparatus can also include means for sending a discovery message from the first device to a second device. The discovery message can include data indicating whether a range determination mechanism is to be used to determine whether to perform an action (e.g., connection setup) in response to the discovery message. For example, the means for sending can include the transmitter 111 of FIG. 1, one or more components of the mobile communication device 900 of FIG. 9, one or more other devices configured to send a message, or any combination thereof.

In another aspect, an apparatus can include means for receiving a discovery message from a first device at a second device, where the discovery message includes a range adaptation indicator bit. For example, the means for receiving can include the receiver 121 of FIG. 1, one or more components of the mobile communication device 900 of FIG. 9, one or more other devices configured to receive a discovery message, or any combination thereof. The apparatus can also include means, responsive to the range adaptation bit having a first value, for decoding the discovery message. For example, the means for decoding can include the decoder 122 of FIG. 1, one or more components of the mobile communication device 900 of FIG. 9, one or more other devices configured to decode a message, or any combination thereof. The apparatus can further include means, responsive to the range adaptation bit having a second value, for selectively decoding or discarding the discovery message based on whether a distance between the second device and the first device is within a discovery range threshold included in the discovery message. For example, the means for selectively decoding or discarding can include the decoder 122 of FIG. 1, another component of the second device 120 of FIG. 1 (e.g., a processor), one or more components of the mobile communication device 900 of FIG. 9, one or more other devices configured to selectively decode or discard a message, or any combination thereof.

As described with respect to the other figures, the mobile device (the second device 120) can determine a range to the mobile device (the first device 110), in various embodiments, using one or more of an RSSI of the discovery message, a RTT measurement operation, an alternate (e.g., non-802.11 based) technology, GPS, fixed wireless access points or cellular towers, and ranging with respect to a third device. In response to determining that the range between the service-seeking device and the service-providing device is within a threshold, the service-seeking device can initiate operations for connection setup (e.g., set up of a WiFi Direct connection). Thus, in some embodiments, the first device 110 can indicate its location to the second device 120, and/or the second device 120 can determine a location indication 115 (FIG. 1) of the first device 110.

As described above, FIGS. 10-11 illustrate particular embodiments of a discovery message (e.g., frames), such as the discovery message 130 of FIGS. 1 and 9. For example, FIG. 10 illustrates a discovery frame 1001 that includes one or more discovery type-length-values (TLVs) 1002.

Figure 10:
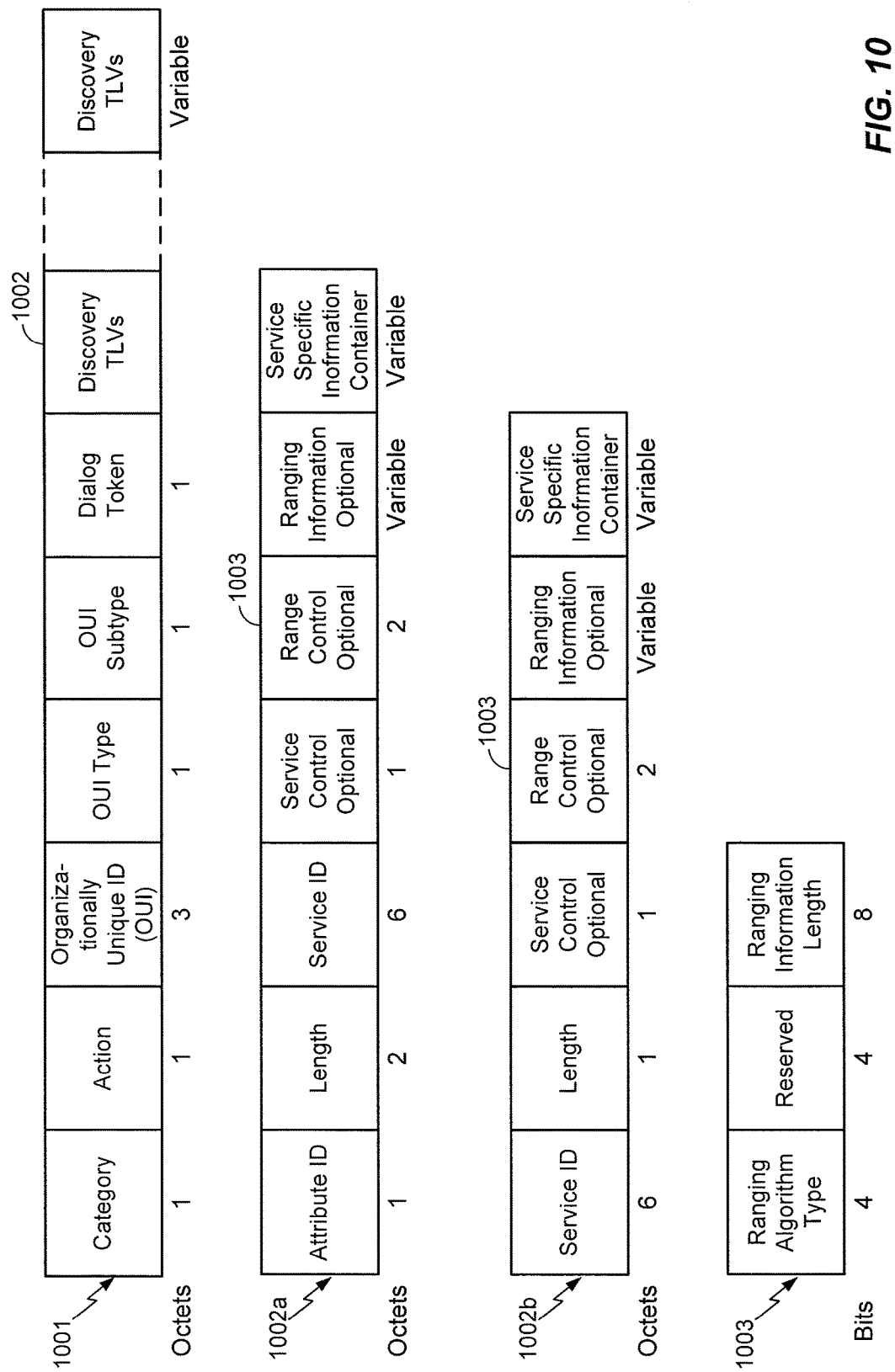
FIG. 10 illustrates a discovery frame that includes one or more discovery type-length-values (TLVs).

Two embodiments of the discovery TLV(s) 1002 are shown in FIG. 10 and designed 1002a and 1002b, respectively. The discovery TLV(s) 1002 can include a six-byte service identifier (ID), as shown. In a particular embodiment, the service ID can be a hash of an application type or service type. For example, when a device stores music videos, the service ID can be a six-byte hash of the string "music videos."

In a particular embodiment, the discovery TLV(s) 1002 can include a two-byte range control field 1003. The range control field 1003 can include four bits that indicate the ranging algorithm (e.g., range determination mechanism) in use (e.g., RSSI, RTT, GPS, etc.).

Figure 11:
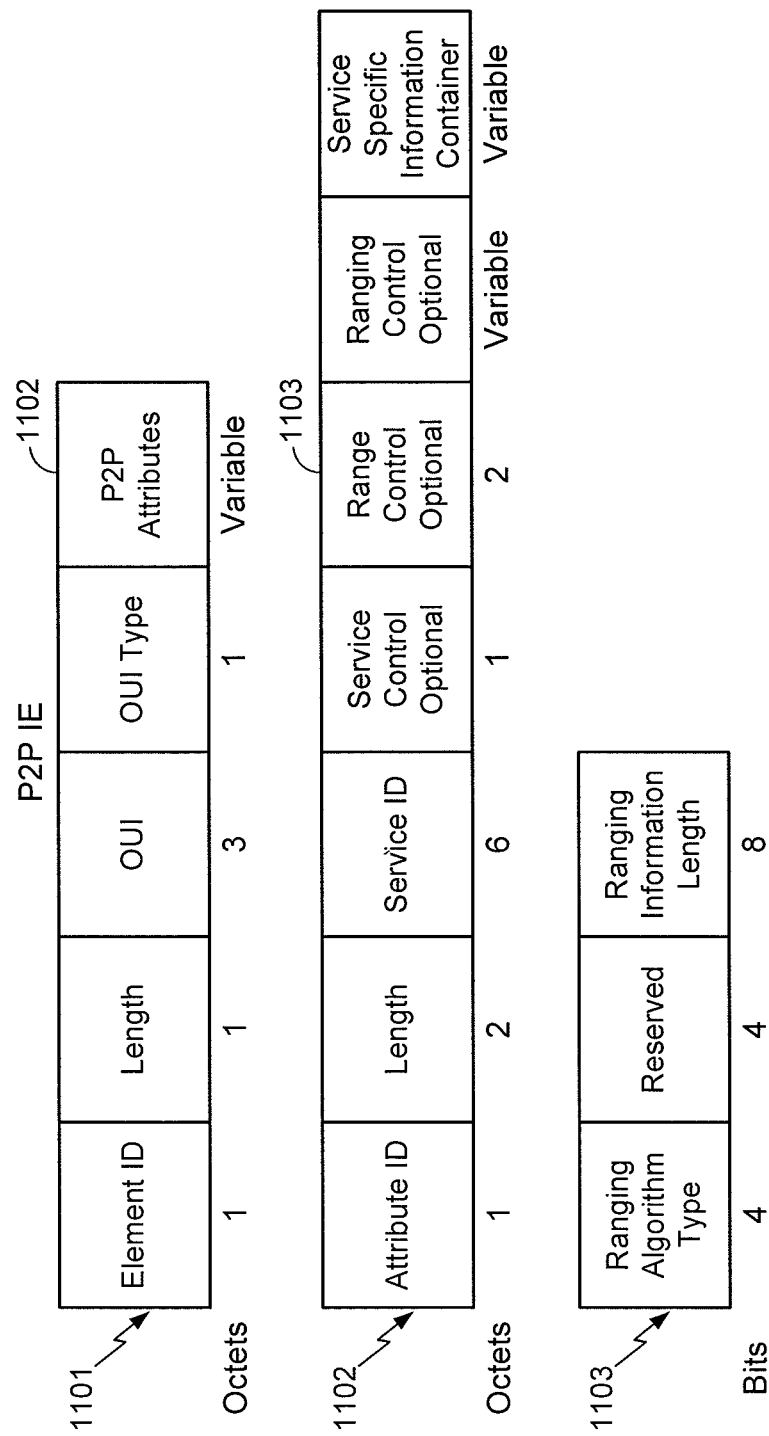
FIG. 11 illustrates an alternate embodiment of a discovery frame.

FIG. 11 illustrates an alternate embodiment of a discovery frame 1101. In FIG. 11, the discovery frame 1101 is a peer-to-peer information element (P2P IE) that includes a P2P attributes field 1102. The P2P attributes field includes a range control field 1103, as shown.

Figure 12:
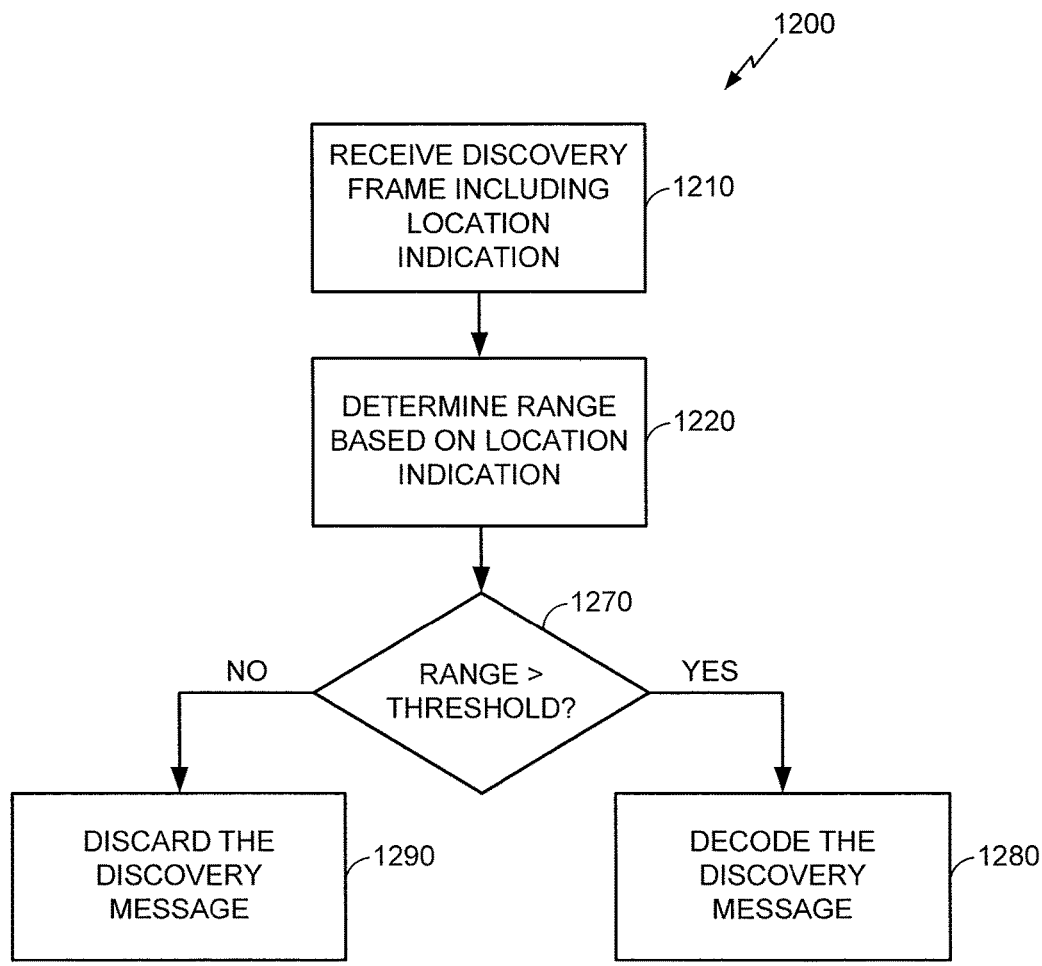
FIG. 12 is a flowchart for an exemplary method of wireless communication that can be employed within the wireless communication system of FIG. 1.

FIG. 12 shows a flowchart 1200 for an exemplary method of wireless communication that can be employed within the wireless communication system 100 of FIG. 1. The method can be implemented in whole or in part by the devices described herein, such as the devices 110 (FIG. 1), 120 (FIG. 1), and/or 900 (FIG. 9). Although the illustrated method is described herein with reference to the wireless communication system 100 described above with respect to FIG. 1, and the wireless device 900 described above with respect to FIG. 9, the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1210, the device 900 receives a discovery frame including a location indication. For example, the second device 120 can receive the discovery message 130, including the location indication 115, from the first device 110. In various embodiments, the location indication 115 can indicate a location of the first device 110. For example, the location indication 115 can include one or more of the following location information: a GPS-based or cellular-based coordinate indication, a third-party location indication (e.g., In-NAV), a list of APs and/or STAs (which can include associated RSSIs and/or RTTs) visible to the first device 110, and a list of cellular base stations (e.g., femto- and/or pico-cells, which can include associated RSSIs and/or RTTs) visible to the first device 110. In various embodiments, the location indication 115 can be formatted as described below with respect to FIG. 13.

Next, at block 1220, the device 900 determines a range based on the location indication. For example, the second device 120 can determine a range to the first device 110, or an indication thereof, based on the location indication 115 included in the discovery message 130. In an embodiment, the second device 120 can determine its own position based on, for example, a GPS or third-party location module. The second device 120 can compare its own position to the location indication 115 to determine a range or approximate range to the first device 110.

In embodiments where the location indication 115 includes information about devices neighboring the first device 110, the second device 120 can determine information about devices neighboring the second device 120. For example, the second device 120 can determine a list of APs and/or STAs (which can include associated RSSIs and/or RTTs) visible to the second device 120, and a list of cellular base stations (e.g., femto- and/or pico-cells, which can include associated RSSIs and/or RTTs) visible to the second device 120. The second device 120 can compare information about neighboring devices to the information about neighboring devices in the location indication 115. For example, the number of neighboring devices visible to both the first device 110 and the second device 120 can indicate a range from the second device 120 to the first device 110. In various embodiments, the second device 120 can determine a weighted and/or scaled range metric based on the number of neighboring devices visible to both the first device 110 and the second device 120 and/or the associated RSSIs or other indications such as RTTs to the neighboring devices. As used herein, neighboring devices can include any subset of APs, STAs, pico- or femto-cells, etc.

Then, at block 1270, the device 900 compares the determined range to a threshold. For example, the second device 120 can compare the determined range, range metric, or range indicator to the discovery range threshold 114. When the distance is within the discovery range threshold 114, the device 900 can decode the discovery message, at block 1280. When the distance is outside the discovery range threshold 114, the device 900 can discard the discovery message, at block 1290. For example, in FIG. 1, the second device 120 can decode or discard the discovery message 130 based on whether the distance 102 is within the discovery range threshold 114.

In an embodiment, the method shown in FIG. 12 can be implemented in a wireless device that can include a receiving circuit, a determining circuit, a discarding circuit, and a decoding circuit. A wireless device can have more components than the simplified wireless device described herein. The wireless device described herein includes those components useful for describing some prominent features of implementations within the scope of the claims.

The receiving circuit can be configured to receive the discovery frame. In an embodiment, the receiving circuit can be configured to implement at least block 1210 of the flowchart 1200 (FIG. 12). The receiving circuit can include one or more of the wireless controller 940 (FIG. 9), the transceiver 950 (FIG. 9), and the antenna 942 (FIG. 9). In some implementations, means for receiving can include the receiving circuit.

The determining circuit can be configured to determine the range. In an embodiment, the determining circuit can be configured to implement at least blocks 1220 and/or 1270 of the flowchart 1200 (FIG. 12). The determining circuit can include one or more of the location determination module 917 (FIG. 9), the processor 910 (FIG. 9) and the memory 932 (FIG. 9). In some implementations, means for determining can include the determining circuit.

The decoding circuit can be configured to decode the discovery frame. In an embodiment, the decoding circuit can be configured to implement at least block 1280 of the flowchart 1200 (FIG. 12). The decoding circuit can include one or more of the processor 910 (FIG. 9), the decoder 992 (FIG. 9), and the memory 932 (FIG. 9). In some implementations, means for decoding can include the decoding circuit.

The discarding circuit can be configured to discard the discovery frame. In an embodiment, the discarding circuit can be configured to implement at least block 1290 of the flowchart 1200 (FIG. 12). The discarding circuit can include one or more of the processor 910 (FIG. 9) and the memory 932 (FIG. 9). In some implementations, means for discarding can include the discarding circuit.

Figure 13:
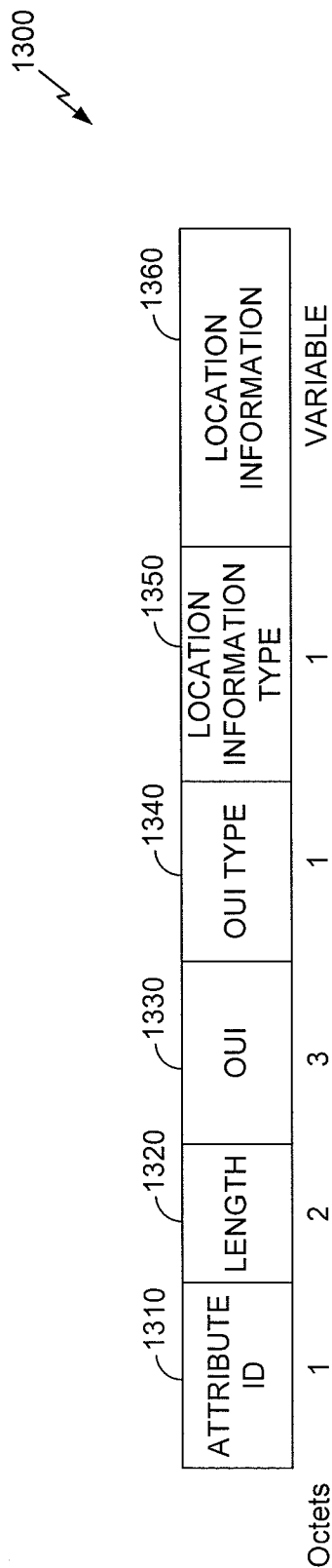
FIG. 13 illustrates an exemplary location information container that can be employed within the wireless communication system of FIG. 1.

FIG. 13 shows an exemplary location information container 1300 that can be employed within the wireless communication system 100 of FIG. 1. In various embodiments, any device described herein, or another compatible device, can transmit the location information container 1300 such as, for example, the devices 110 (FIG. 1), 120 (FIG. 1), and/or 900 (FIG. 9). One or more messages in the wireless communication system 100 can include the location information container 1300 such as, for example, a beacon, the discovery message 130 (FIG. 1), the discovery frame 1001 (FIG. 10), a probe response, and/or a discovery query frame. In one embodiment, the location information container 1300 can include a discovery TLV 1002 as described above with respect to FIGS. 10-12.

In the illustrated embodiment, location information container 1300 includes an attribute identifier 1310, a length field 1320, an organizationally unique identifier (OUI) field

1330, an OUI type field 1340, a location information type field 1350, and a location information field 1360. The location information container 1300 can include additional fields, and fields can be rearranged, removed, and/or resized. For example, in various embodiments, the attribute identifier 1310, the OUI field 1330, and/or the OUI type field 1340 can be replaced with one or more of an element ID, a service ID, etc.

The attribute identifier field 1310 can include a value which identifies the element as the location information container 1300. The attribute identifier field 1310 shown is one octet long. In some implementations, the attribute identifier field 1310 can be two, five, or twelve octets long. In some implementations, the attribute identifier field 1310 can be of variable length, such as varying length from signal to signal and/or as between service providers.

The length field 1320 can serve to indicate the length of the location information container 1300 or the total length of subsequent fields. The length field 1320 shown in FIG. 13 is two octets long. In some implementations, the length field 1320 can be one, five, or twelve octets long. In some implementations, the length field 1320 can be of variable length, such as varying length from signal to signal and/or as between service providers. In some embodiments, a length of zero (or another predetermined token value) can indicate that one or more other fields are not present.

The OUI field 1330 can serve to uniquely identify a vendor, manufacturer, or other organization (referred to as an "assignee") globally or worldwide and can effectively reserve a block of each possible type of derivative identifier (such as MAC addresses, group addresses, Subnetwork Access Protocol identifiers, etc.) for the exclusive use of the assignee. The OUI field 1330 shown in FIG. 13 is three octets long. In some implementations, the OUI field 1330 can be two, five, or twelve octets long. In some implementations, the OUI field 1330 can be of variable length, such as varying length from signal to signal and/or as between service providers.

The OUI type field 1340 can serve to indicate a type of the OUI field 1330 such as, for example, a MAC identifier, a context dependent identifier (CDI), an extended unique identifier (EUI), etc. The OUI type field 1340 shown in FIG. 13 is one octet long. In some implementations, the OUI type field 1340 can be two, five, or twelve octets long. In some implementations, the OUI type field 1340 can be of variable length, such as varying length from signal to signal and/or as between service providers.

The location information type field 1350 can serve to indicate a type or format of the location information field 1360. For example, the location information type field 1350 can indicate that the location information field 1360 includes one or more of a GPS-based or cellular-based coordinate indication, a third-party location indication (e.g., In-NAV), a list of APs and/or STAs (which can include associated RSSIs and/or RTTs) visible, and a list of cellular base stations (e.g., femto- and/or pico-cells, which can include associated RSSIs and/or RTTs) visible. The location information type field 1350 shown in FIG. 13 is one octet long. In some implementations, the location information type field 1350 can be two, five, or twelve octets long. In some implementations, the location information type field 1350 can be of variable length, such as varying length from signal to signal and/or as between service providers.

The location information 1360 can serve to indicate location of a transmitting device. For example, the location information 1360 can include one or more of: a GPS-based or cellular-based coordinate indication, a third-party location indication (e.g., In-NAV), a list of APs and/or STAs (which can include associated RSSIs and/or RTTs) visible, and a list of cellular base stations (e.g., femto- and/or pico-cells, which can include associated RSSIs and/or RTTs) visible. In various embodiments, such lists can include strings of device identifiers, compressed lists, bitmaps, bloom filters, and/or other compressed or uncompressed representations indicating visible devices. The location information 1360 shown in FIG. 13 is of variable length, such as varying length from signal to signal and/or as between service providers.

In various embodiments, the various ranging methods described herein with respect to FIGS. 1-12 can be applied in a hierarchical fashion. For example, the second device 120 (FIG. 1) can apply a first ranging method. In various embodiments, the first ranging method can be relatively easy to measure (e.g., low-power, low-latency, low-signaling, low-processing, etc.), relatively low accuracy, etc. If the first ranging method does not provide sufficient ranging accuracy to proceed, the second device 120 can apply a second ranging method, and so on with additional ranging methods. In various embodiments, the second ranging method can be relatively harder to measure (e.g., higher power, higher latency, higher signaling, higher processing, etc.), a relatively higher accuracy, etc. Although hierarchical ranging is described below with respect to RSSI as a first ranging method and WIT as a second ranging method, any of the ranging methods described herein can be used as any of first, second, third, fourth, etc. hierarchical ranging methods, including but not limited to RSSI, transmit power, MCS, RTT, GPS-based or cellular-based location indication, information about visible devices, etc.

Figure 14:
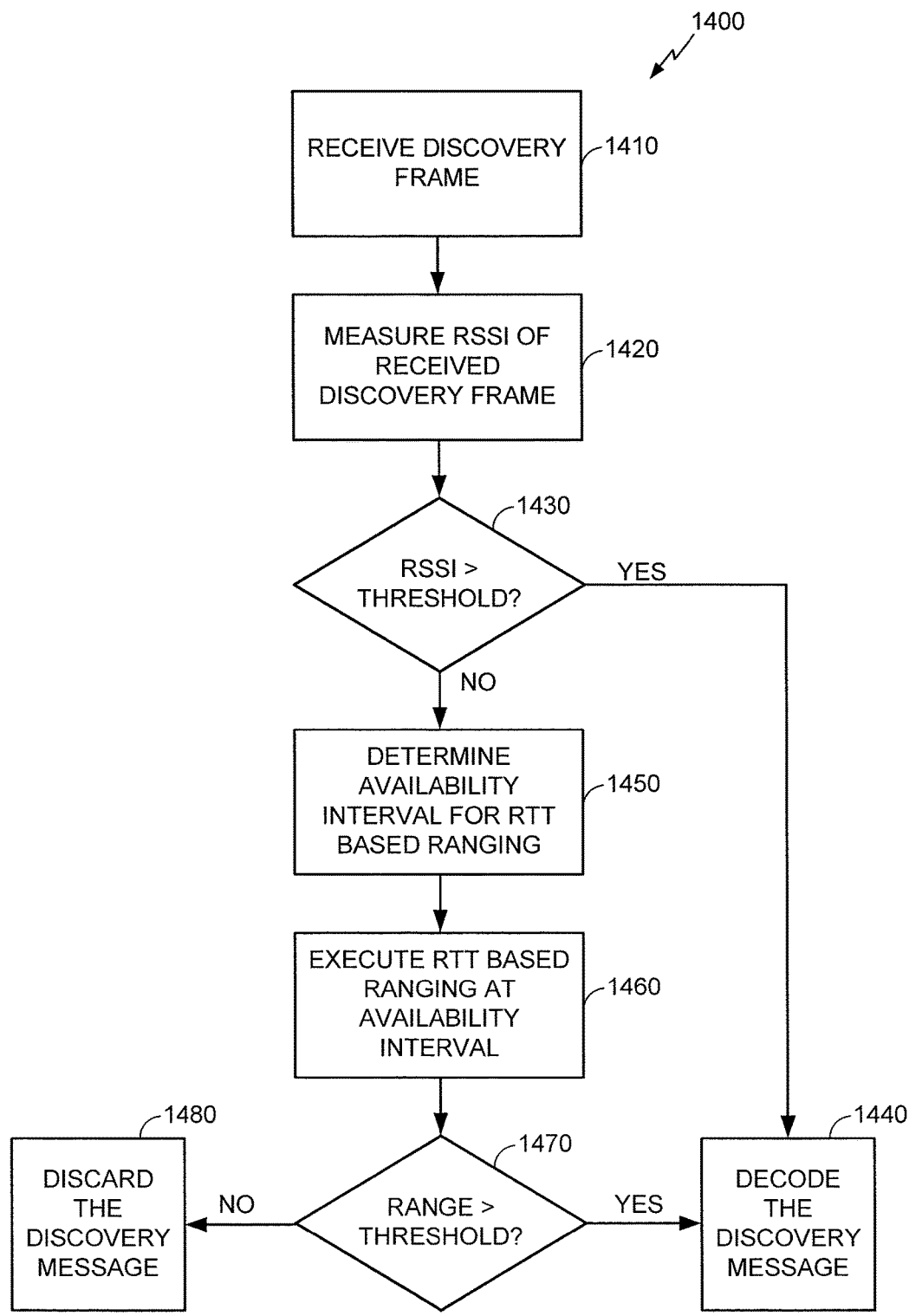
FIG. 14 is a flowchart for an exemplary method of wireless communication that can be employed within the wireless communication system of FIG. 1.

FIG. 14 shows a flowchart 1400 for an exemplary method of wireless communication that can be employed within the wireless communication system 100 of FIG. 1. The method can be implemented in whole or in part by the devices described herein, such as the devices 110 (FIG. 1), 140 (FIG. 1), and/or 900 (FIG. 9). Although the illustrated method is described herein with reference to the wireless communication system 100 described above with respect to FIG. 1, and the wireless device 900 described above with respect to FIG. 9, the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1410, the device 900 receives a discovery frame. For example, the device 140 can receive the discovery message 150 from the first device 110. In various embodiments, the discovery frame can include one or more ranging indicators such as, for example, a TX power, an MCS, a location indication 115, etc.

Next, at block 1420, the device 900 measures an RSSI of the received discovery frame. For example, the device 140 can determine an RSSI of the discovery message 150, as described above with respect to FIGS. 1-8. In various embodiments, RSSI can be replaces with another first ranging indicator, which can be less accurate and/or less expensive to determine than subsequent ranging indicators.

Then, at block 1430, the device 900 compares the RSSI (or the other first ranging indicator) to a threshold. For example, the device 900 can retrieve the discover range threshold 114 from the memory 932 and compare to the RSSI using the processor 910. If the RSSI (or other first ranging indicator) is above the discovery range threshold 114, the device 900 can proceed to decode the discovery message at block 1440. For example, if the first ranging indicator is sufficiently high, the second device 120 can determine that the first device 110 is within range and can omit subsequent (potentially higher-quality) ranging methods. On the other hand, if the RSSI (or other first ranging indicator) is below or equal to the discovery range threshold 114, the device 900 can proceed to perform one or more subsequent ranging methods at block 1450.

Subsequently, at block 1450, the device 900 determines an availability interval for RTT-based ranging. In various embodiments, the discovery frame can include an indication of one or more time intervals for RTT-based ranging. For example, the first device 110 can encode one or more available time intervals for RTT-based ranging in the discovery message 130, as described below with respect to FIG. 15.

Thereafter, at block 1460, the device 900 performs the RTT-based ranging during one of the determined availability intervals. For example, the second device 120 can wait for an availability interval, and can perform RTT-based ranging as described above with respect to FIGS. 1-8. In various embodiments, blocks 1450 and 1460 can be replaced with a different second ranging method, which can be more accurate and/or more expensive to determine than prior ranging methods.

Then, at block 1470, the device 900 compares the RTT (or the other second ranging indicator) to a threshold (which can be different from the RSSI threshold above). For example, the device 900 can retrieve the discovery range threshold 114 from the memory 932 and compare to the RTT using the processor 910. If the RTT (or other second ranging indicator) is above the discovery range threshold 114, the device 900 can proceed to decode the discovery message at block 1440. For example, if the second ranging indicator is sufficiently high, the second device 120 can determine that the first device 110 is within range and can omit subsequent (potentially higher-quality) ranging methods. On the other hand, if the RTT (or other second ranging indicator) is below or equal to the discovery range threshold 114, the device 900 can proceed to discard the discovery message at block 1480.

In various alternative embodiments, if the RTT (or other second ranging indicator) is below or equal to the discovery range threshold 114, the device 900 can perform one or more subsequent ranging methods such as third, fourth, etc. hierarchical ranging methods, including but not limited to RSSI, transmit power, MCS, RTT, GPS-based or cellular-based location indication, information about visible devices, etc.

In an embodiment, the method shown in FIG. 14 can be implemented in a wireless device that can include a receiving circuit, a measuring circuit, a determining circuit, an executing circuit, a discarding circuit, and a decoding circuit. A wireless device can have more components than the simplified wireless device described herein. The wireless device described herein includes those components useful for describing some prominent features of implementations within the scope of the claims.

The receiving circuit can be configured to receive the discovery frame. In an embodiment, the receiving circuit can be configured to implement at least block 1410 of the flowchart 1400 (FIG. 14). The receiving circuit can include one or more of the wireless controller 940 (FIG. 9), the transceiver 950 (FIG. 9), and the antenna 942 (FIG. 9). In some implementations, means for receiving can include the receiving circuit.

The measuring circuit can be configured to measure the RSSI or other first range indication. In an embodiment, the measuring circuit can be configured to implement at least block 1420 of the flowchart 1400 (FIG. 14). The measuring circuit can include one or more of the processor 910 (FIG. 9), the wireless controller 940 (FIG. 9), the transceiver 950 (FIG. 9), and the antenna 942 (FIG. 9). In some implementations, means for measuring can include the measuring circuit.

The determining circuit can be configured to determine the range, compare ranging indications to thresholds, determine an availability interval, etc. In an embodiment, the determining circuit can be configured to implement at least blocks 1430-1450 and/or 1470 of the flowchart 1400 (FIG. 14). The determining circuit can include one or more of the location determination module 917 (FIG. 9), the processor 910 (FIG. 9) and the memory 932 (FIG. 9). In some implementations, means for determining can include the determining circuit.

The executing circuit can be configured to execute RTT-based ranging or other second ranging method. In an embodiment, the executing circuit can be configured to implement at least block 1460 of the flowchart 1400 (FIG. 14). The executing circuit can include one or more of the processor 910 (FIG. 9), the memory 932 (FIG. 9), the wireless controller 940 (FIG. 9), the transceiver 950 (FIG. 9), and the antenna 942 (FIG. 9). In some implementations, means for executing can include the executing circuit.

The decoding circuit can be configured to decode the discovery frame. In an embodiment, the decoding circuit can be configured to implement at least block 1440 of the flowchart 1400 (FIG. 14). The decoding circuit can include one or more of the processor 910 (FIG. 9), the decoder 992 (FIG. 9), and the memory 932 (FIG. 9). In some implementations, means for decoding can include the decoding circuit.

The discarding circuit can be configured to discard the discovery frame. In an embodiment, the discarding circuit can be configured to implement at least block 1480 of the flowchart 1400 (FIG. 14). The discarding circuit can include one or more of the processor 910 (FIG. 9) and the memory 932 (FIG. 9). In some implementations, means for discarding can include the discarding circuit.

Figure 15:
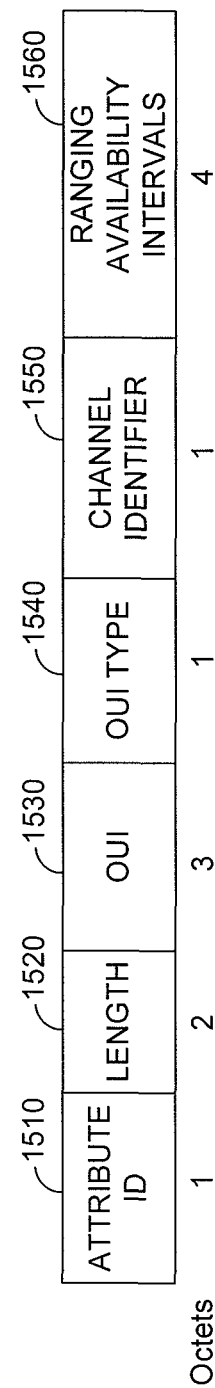
FIG. 15 illustrates an exemplary ranging availability container that can be employed within the wireless communication system of FIG. 1.

FIG. 15 shows an exemplary ranging availability container 1500 that can be employed within the wireless communication system 100 of FIG. 1. In various embodiments, any device described herein, or another compatible device, can transmit the ranging availability container 1500 such as, for example, the devices 110 (FIG. 1), 140 (FIG. 1), and/or 900 (FIG. 9). One or more messages in the wireless communication system 100 can include the ranging availability container 1500 such as, for example, a beacon, the discovery frame 150 (FIG. 1), the discovery frame 1001 (FIG. 10), a probe response, and/or a discovery query frame. In one embodiment, the ranging availability container 1500 can include a discovery TLV 1002 described above with respect to FIGS. 10-11.

In the illustrated embodiment, ranging availability container 1500 includes an attribute identifier 1510, a length field 1520, an organizationally unique identifier (OUI) field 1530, an OUI type field 1540, a channel identifier 1550, and a ranging availability intervals indication 1560. The ranging availability container 1500 can include additional fields, and fields can be rearranged, removed, and/or resized. For example, in various embodiments, the attribute identifier 1510, the OUI field 1530, and/or the OUI type field 1540 can be replaced with one or more of an element ID, a service ID, etc.

The attribute identifier field 1510 can include a value which identifies the element as the ranging availability container 1500. The attribute identifier field 1510 shown is one octet long. In some implementations, the attribute identifier field 1510 can be two, five, or twelve octets long. In some implementations, the attribute identifier field 1510 can be of variable length, such as varying length from signal to signal and/or as between service providers.

The length field 1520 can serve to indicate the length of the ranging availability container 1500 or the total length of subsequent fields. The length field 1520 shown in FIG. 15 is two octets long. In some, implementations, the length field 1520 can be one, five, or twelve octets long. In some implementations, the length field 1520 can be of variable length, such as varying length from signal to signal and/or as between service providers. In some embodiments, a length of zero (or another predetermined token value) can indicate that one or more other fields are not present.

The OUI field 1530 can serve to uniquely identify a vendor, manufacturer, or other organization (referred to as an "assignee") globally or worldwide and can effectively reserve a block of each possible type of derivative identifier (such as MAC addresses, group addresses, Subnetwork Access Protocol identifiers, etc.) for the exclusive use of the assignee. The OUI field 1530 shown in FIG. 15 is three octets long. In some implementations, the OUI field 1530 can be two, five, or twelve octets long. In some implementations, the OUI field 1530 can be of variable length, such as varying length from signal to signal and/or as between service providers.

The OUI type field 1540 can serve to indicate a type of the OUI field 1530 such as, for example, a MAC identifier, a context dependent identifier (CDI), an extended unique identifier (EUI), etc. The OUI type field 1540 shown in FIG. 15 is one octet long. In some implementations, the OUI type field 1540 can be two, five, or twelve octets long. In some implementations, the OUI type field 1540 can be of variable length, such as varying length from signal to signal and/or as between service providers.

The channel identifier 1550 can serve to indicate a channel number on which the transmitting STA is available for ranging. In some embodiments, the channel identifier 1550 can indicate a plurality of available channels. The channel identifier 1550 shown in FIG. 15 is one octet long. In some implementations, the channel identifier 1550 can be two, five, or twelve octets long. In some implementations, the channel identifier 1550 can be of variable length, such as varying length from signal to signal and/or as between service providers.

The ranging availability intervals 1560 can serve to indicate one or more time intervals during which the transmitting STA is available for ranging. For example, the ranging availability intervals 1560 can include a list of time intervals. In various embodiments, such lists can include strings of device identifiers, compressed lists, bitmaps, bloom filters, and/or other compressed or uncompressed representations.

In one particular embodiment, the ranging availability intervals 1560 can include a bitmap dividing a time between beginnings of consecutive discovery windows in a given neighborhood aware networking (NAN) cluster into 32 consecutive time intervals of equal durations. Thus, in an embodiment, when the first device 110 sets the first bit in the bitmap, it indicates that it will be available during the first of the 32 time intervals, and so on. In an embodiment, when the first device 110 does not set the first bit in the bitmap, it may still be available during the first of the 32 time intervals, and so on, but does not explicitly indicate such.

The ranging availability intervals 1560 shown in FIG. 15 are four octets long. In some implementations, the ranging availability intervals 1560 can be two, five, or twelve octets long. In some implementations, the ranging availability intervals 1560 can be of variable length, such as varying length from signal to signal and/or as between service providers.

In various P2P embodiments, wireless devices can act as publishing devices (e.g., a device advertising a service) and/or a subscribing device (e.g., a device accessing the service). For example, in the P2P museum environment 200 described above with respect to FIG. 2, each of the paintings P1-P9 can include wireless devices publishing informational services. In various embodiments, publishing and/or subscribing devices can advertise one or more time periods and/or channels in which they are available for one or more of P2P frame exchange, ranging, basic service set (BSS) frames, independent BSS (IBSS) frames, mesh networking frames, NAN frames, etc. In various embodiments, the time period during which a device is available for P2P frame exchange and the time period during which devices are available for ranging can be the same time period.

Figure 16:
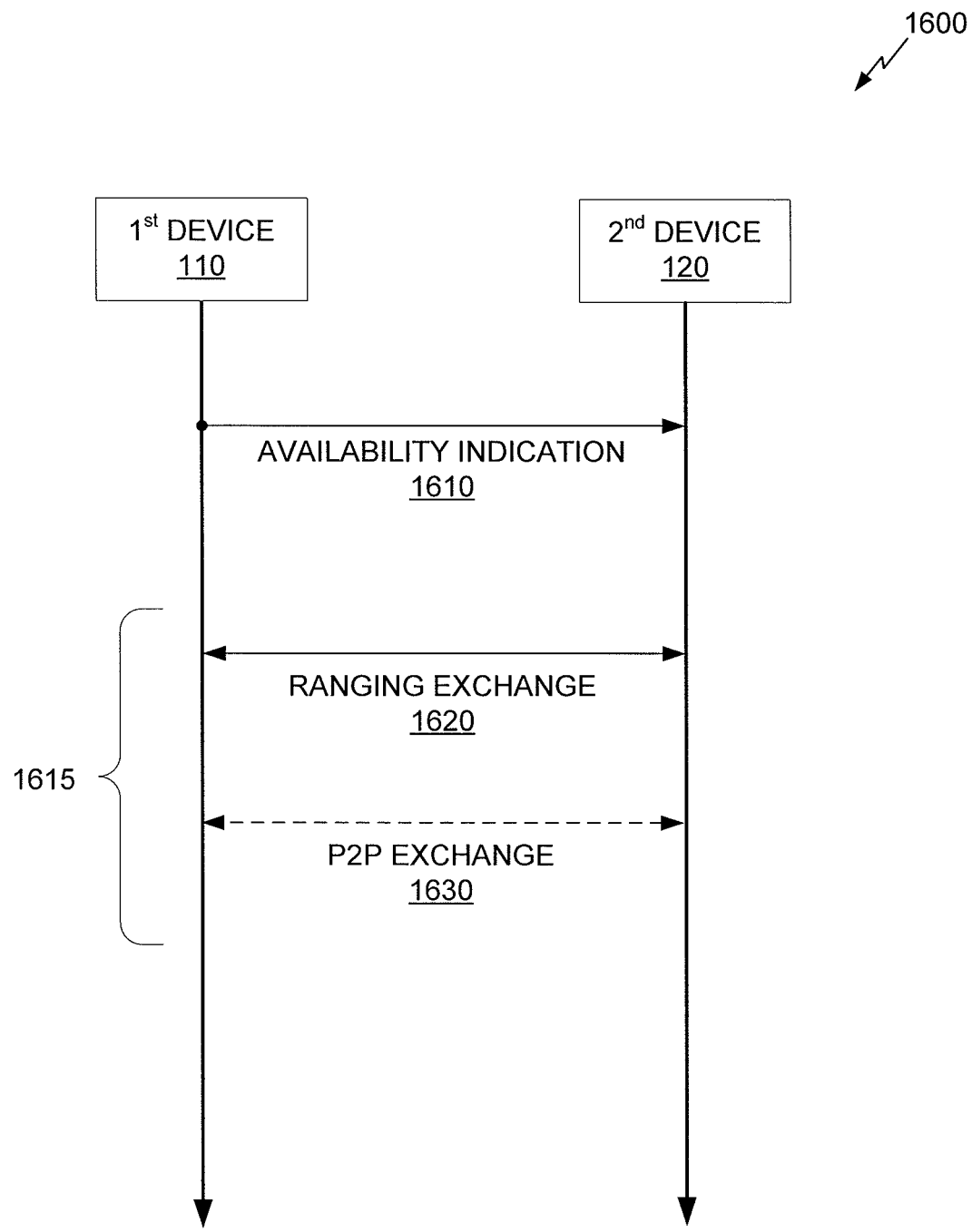
FIG. 16 is a timing diagram showing various communications in the wireless communication system of FIG. 1, according to an embodiment.

FIG. 16 is a timing diagram 1600 showing various communications in the wireless communication system 100 of FIG. 1, according to an embodiment. As shown in the timing diagram 1600, communications between the first device 110 and the second device 120 progress sequentially from top to bottom. Communications are shown as a line originating from a transmitter (indicated with a dot) and being received by a receiver (indicated with an arrowhead). Although the illustrated timing diagram 1600 refers to the device configuration shown in FIG. 1, other configurations are possible including, for example, omission of various devices shown or addition of other devices. For example, in various embodiments, the first device 110 can be a publishing device, and the second device can be a subscribing device, or vice versa. Moreover, although the timing diagram 1600 is described herein with reference to a particular order, in various embodiments, communications shown herein can be performed in a different order, or omitted, and additional communications can be added. For example, in various embodiments, one or more control frames can be added or omitted including acknowledgement (ACK) frames and/or end frames.

In FIG. 16, the first device 110 transmits an availability indication 1610 to the second device. In various embodiments, the availability indication 1610 can indicate one or more availability windows (e.g., time periods or time windows) 1615 during which the first device 110 is available for determining a range between the first device in the second device. In some embodiments, availability indication may be interpreted as providing an availability for ranging and/or P2P frame exchange. The availability indication 1610 can indicate a channel on which the first device 110 is available for one or more of P2P frame exchange, ranging, BSS frames, IBSS frames, mesh networking frames, NAN frames, etc. In some embodiments, availability for ranging can coincide with availability for P2P frame exchange.

In various embodiments, the availability indication 1610 can be included in the discovery frames 1001 and 1101, as described with respect to FIGS. 10-11, or any portion thereof. The availability indication 1610 can include (or be included in) any of the frame formats described herein such as, for example, a ranging attribute 1700 described below with respect to FIG. 17, a ranging attribute 1800 described below with respect to FIG. 18, and/or an availability attribute 1900 described below with respect to FIG. 19. Thus, for example, the first device 110 can transmit a service discovery frame including a service ID and a P2P attribute as described herein.

In some embodiments, a publishing device can transmit an indication that ranging is mandatory for a particular service. The indication that ranging is mandatory can be included in, for example, a service ID or other attribute. For example, the painting P1 (FIG. 2) can indicate that the informational service can only be provided after performing a ranging operation. In various embodiments, the publishing and/or subscribing device can indicate a ranging method (for example, in the service ID or other attribute).

Next, the second device 120 may initiate a ranging operation (e.g., a ranging exchange) 1620 (e.g., determining a range between the first device and the second device) within the availability window 1615. In various embodiments, the ranging operation 1620 can include any of the ranging methods described herein such as, for example, those described above with respect to FIGS. 3-8, 12, and/or 14. For example, the second device 120 can initiate a RTT ranging operation.

Then, in some embodiments, the publishing device (which can be the first device 110 or the second device 120) can determine whether the subscribing device is within an acceptable range for a published service. If the subscribing device is within range, the first device 110 and the second device 120 can exchange P2P frames. For example, the second device 120 can perform a P2P association with the first device 110.

As described above, the first device 110 and the second device 120 can variously act as publishing and subscribing devices. Thus, in some embodiments, the publishing device transmits the availability indication 1610 and the subscribing device initiates the ranging operation 1620 and/or a P2P exchange 1630. Moreover, in some embodiments, the subscribing device transmits the availability indication 1610 and the publishing device initiates the ranging operation 1620 and/or the P2P exchange 1630.

Figure 17:
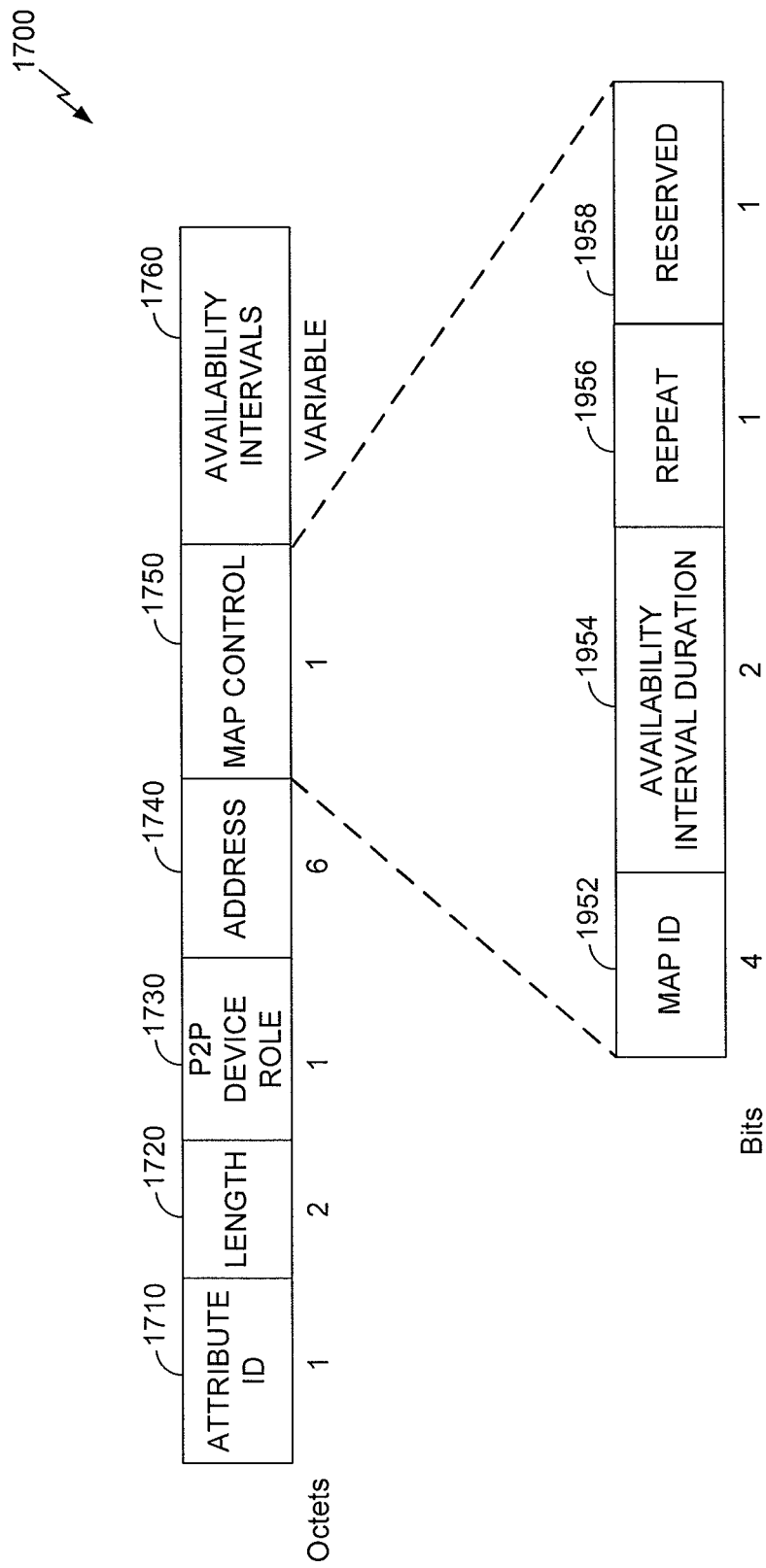
FIG. 17 illustrates an exemplary P2P attribute that can be employed within the wireless communication system of FIG. 1.

FIG. 17 shows an exemplary P2P attribute 1700 that can be employed within the wireless communication system 100 of FIG. 1. In various embodiments, any device described herein, or another compatible device, can transmit the P2P attribute 1700 such as, for example, the devices 110 (FIG. 1), 140 (FIG. 1), and/or 900 (FIG. 9). One or more messages in the wireless communication system 100 can include the P2P attribute 1700 such as, for example, a beacon, the discovery frame 170 (FIG. 1), the discovery frame 1001 (FIG. 10), a probe response, and/or a discovery query frame. In one embodiment, the P2P attribute 1700 can include a discovery TLV 1002 described above with respect to FIGS. 10-11.

In the illustrated embodiment, P2P attribute 1700 includes an attribute identifier 1710, a length field 1720, a P2P device role field 1730, an address field 1740, a map control field 1750, and a P2P availability intervals indication 1760. The P2P attribute 1700 can include additional fields, and fields can be rearranged, removed, and/or resized.

The attribute identifier field 1710 can include a value which identifies the element as the P2P attribute 1700. The illustrated attribute identifier field 1710 is one octet long. In some implementations, the attribute identifier field 1710 can be two, five, or twelve octets long. In some implementations, the attribute identifier field 1710 can be of variable length, such as varying length from signal to signal and/or as between service providers.

The length field 1720 can serve to indicate the length of the P2P attribute 1700 or the total length of subsequent fields. The illustrated length field 1720 is two octets long. In some implementations, the length field 1720 can be one, five, or twelve octets long. In some implementations, the length field 1720 can be of variable length, such as varying length from signal to signal and/or as between service providers. In some embodiments, a length of zero (or another predetermined token value) can indicate that one or more other fields are not present.

The P2P device role field 1730 can serve to indicate a P2P role of the transmitting device. The illustrated P2P device role field 1730 is one octet long. In some implementations, the P2P device role field 1730 can be two, five, or twelve octets long. In some implementations, the P2P device role field 1730 can be of variable length, such as varying length from signal to signal and/or as between service providers.

The address field 1740 can serve to indicate an address (such as a MAC address) of a P2P group owner, P2P client, and/or NAN device P2P device address. In various embodiments, the address indicated in the address field 1740 can be based on the P2P device role field 1730. The illustrated address field 1740 is six octets long. In some implementations, the address field 1740 can be two, five, or twelve octets long. In some implementations, the address field 1740 can be of variable length, such as varying length from signal to signal and/or as between service providers.

The map control field 1750 can serve to provide information regarding the P2P availability intervals indication 1760. The illustrated map control field 1750 is one octet long. In some implementations, the map control field 1750 can be two, five, or twelve octets long. In some implementations, the map control field 1750 can be of variable length, such as varying length from signal to signal and/or as between service providers. As illustrated, the map control field 1750 includes a four-bit map ID field 1752, a two-bit availability interval duration field 1754, a one-bit repeat flag 1756, and a reserved bit 1758. The map control field 1750 can include additional fields, and fields can be rearranged, removed, and/or resized.

The map ID field 1752 serves to identify the P2P availability intervals indication 1760. The availability interval duration field 1754 serves to indicate the availability interval duration associated with the P2P availability intervals indication 1760. For example, where the P2P availability intervals indication 1760 includes a bitmap of available intervals, an availability interval duration value of 0 can indicate that each bit of the bitmap represents a 16 ms interval, an availability interval duration value of 1 can indicate that each bit of the bitmap represents a 32 ms interval, an availability interval duration value of 3 can indicate that each bit of the bitmap represents a 64 ms interval, etc. The repeat flag 1756 can serve to indicate whether the signaled availability applies only to the next discovery window interval or if the signaled availability repeats for future discovery window intervals until otherwise changed.

The P2P availability intervals 1760 can serve to indicate one or more time intervals during which the transmitting STA is available for P2P frame exchange and/or ranging. In some embodiments, the transmitting STA is available for ranging during the window for which it is available for P2P frame exchange. For example, the ranging availability intervals 1760 can include a list of time intervals. In various embodiments, such lists can include strings of device identifiers, compressed lists, bitmaps, bloom filters, and/or other compressed or uncompressed representations.

In one particular embodiment, the ranging availability intervals 1760 can include a bitmap dividing a time between beginnings of consecutive discovery windows in a given neighborhood aware networking (NAN) cluster into 32 consecutive time intervals of equal durations. Thus, in an embodiment, when the first device 110 sets the first bit in the bitmap, it indicates that it will be available during the first of the 32 time intervals, and so on. In an embodiment, when the first device 110 does not set the first bit in the bitmap, it may still be available during the first of the 32 time intervals, and so on, but does not explicitly indicate such.

Figure 18:
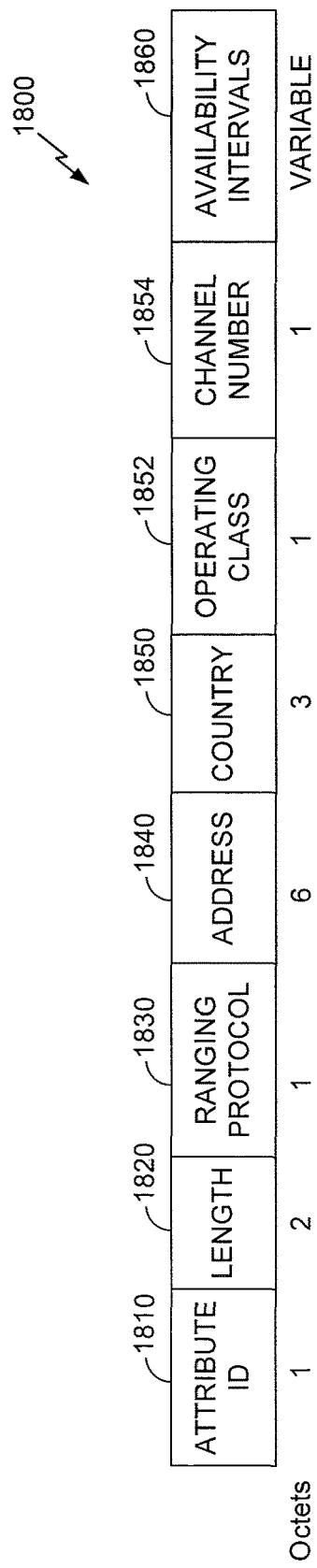
FIG. 18 illustrates an exemplary ranging attribute that can be employed within the wireless communication system of FIG. 1.

FIG. 18 shows an exemplary ranging attribute 1800 that can be employed within the wireless communication system 100 of FIG. 1. In various embodiments, any device described herein, or another compatible device, can transmit the ranging attribute 1800 such as, for example, the devices 110 (FIG. 1), 140 (FIG. 1), and/or 900 (FIG. 9). One or more messages in the wireless communication system 100 can include the ranging attribute 1800 such as, for example, a beacon, the discovery frame 180 (FIG. 1), the discovery frame 1001 (FIG. 10), a probe response, and/or a discovery query frame. In one embodiment, the ranging attribute 1800 can include a discovery TLV 1002 described above with respect to FIGS. 10-11.

In the illustrated embodiment, ranging attribute 1800 includes an attribute identifier 1810, a length field 1820, a ranging protocol field 1830, an address field 1840, a country field 1850, an operating class field 1852, a channel number field 1854, and a ranging availability intervals indication 1860. The ranging attribute 1800 can include additional fields, and fields can be rearranged, removed, and/or resized.

The attribute identifier field 1810 can include a value which identifies the element as the ranging attribute 1800. The illustrated attribute identifier field 1810 is one octet long. In some implementations, the attribute identifier field 1810 can be two, five, or twelve octets long. In some implementations, the attribute identifier field 1810 can be of variable length, such as varying length from signal to signal and/or as between service providers.

The length field 1820 can serve to indicate the length of the ranging attribute 1800 or the total length of subsequent fields. The illustrated length field 1820 is two octets long. In some implementations, the length field 1820 can be one, five, or twelve octets long. In some implementations, the length field 1820 can be of variable length, such as varying length from signal to signal and/or as between service providers. In some embodiments, a length of zero (or another predetermined token value) can indicate that one or more other fields are not present.

The ranging protocol field 1830 can serve to indicate a particular ranging protocol or algorithm for use during the ranging availability intervals 1860. The illustrated ranging protocol field 1830 is one octet long. In some implementations, the ranging protocol field 1830 can be two, five, or twelve octets long. In some implementations, the ranging protocol field 1830 can be of variable length, such as varying length from signal to signal and/or as between service providers.

The address field 1840 can serve to indicate an address (such as a MAC address) of a P2P group owner, P2P client, and/or NAN device P2P device address. In various embodiments, the address indicated in the address field 1840 can be based on the ranging protocol field 1830. The illustrated address field 1840 is six octets long. In some implementations, the address field 1840 can be two, five, or twelve octets long. In some implementations, the address field 1840 can be of variable length, such as varying length from signal to signal and/or as between service providers.

The country field 1850 can serve to provide a value included in a dot11CountryString attribute, which can specify a country code in which specified operating class 1852 and channel number 1854 are valid. The illustrated country field 1850 is three octets long. In some implementations, the country field 1850 can be two, five, or twelve octets long. In some implementations, the country field 1850 can be of variable length, such as varying length from signal to signal and/or as between service providers.

The operating class field 1852 can serve to indicate a frequency band at which a P2P group is currently operating or a NAN P2P device's listen channel. The illustrated country field 1850 is one octet long. In some implementations, the country field 1850 can be two, five, or twelve octets long. In some implementations, the country field 1850 can be of variable length, such as varying length from signal to signal and/or as between service providers.

The channel number 1854 can serve to indicate a channel number on which the transmitting STA is available for ranging. In some embodiments, the channel number 1854 can indicate a plurality of available channels. The illustrated channel number 1854 is one octet long. In some implementations, the channel number 1854 can be two, five, or twelve octets long. In some implementations, the channel number 1854 can be of variable length, such as varying length from signal to signal and/or as between service providers.

The ranging availability intervals 1860 can serve to indicate one or more time intervals during which the transmitting STA is available for ranging. For example, the ranging availability intervals 1860 can include a list of time intervals. In various embodiments, such lists can include strings of device identifiers, compressed lists, bitmaps, bloom filters, and/or other compressed or uncompressed representations.

In one particular embodiment, the ranging availability intervals 1860 can include a bitmap dividing a time between beginnings of consecutive discovery windows in a given neighborhood aware networking (NAN) cluster into 32 consecutive time intervals of equal durations. Thus, in an embodiment, when the first device 110 sets the first bit in the bitmap, it indicates that it will be available during the first of the 32 time intervals, and so on. In an embodiment, when the first device 110 does not set the first bit in the bitmap, it may still be available during the first of the 32 time intervals, and so on, but does not explicitly indicate such.

Figure 19:
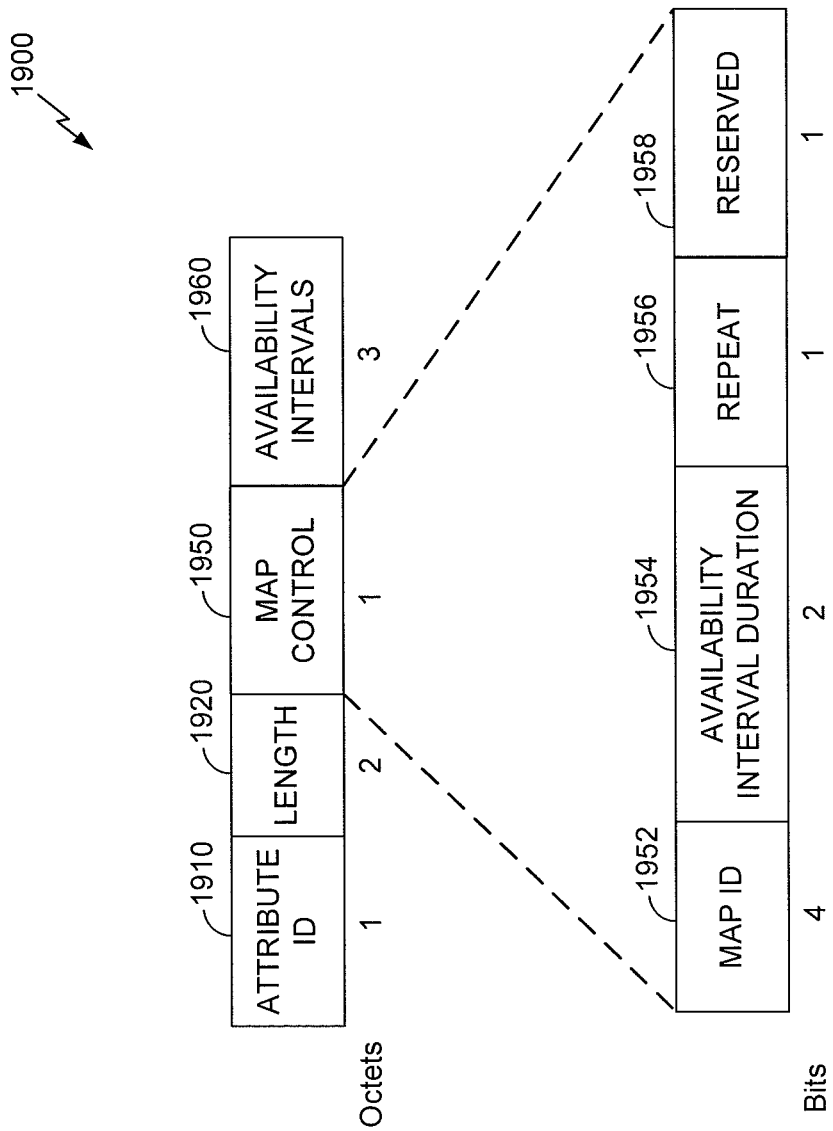
FIG. 19 illustrates an exemplary availability attribute that can be employed within the wireless communication system of FIG. 1.

FIG. 19 shows an exemplary availability attribute 1900 that can be employed within the wireless communication system 100 of FIG. 1. In various embodiments, any device described herein, or another compatible device, can transmit the availability attribute 1900 such as, for example, the devices 110 (FIG. 1), 140 (FIG. 1), and/or 900 (FIG. 9). One or more messages in the wireless communication system 100 can include the availability attribute 1900 such as, for example, a beacon, the discovery frame 190 (FIG. 1), the discovery frame 1001 (FIG. 10), a probe response, and/or a discovery query frame. In one embodiment, the availability attribute 1900 can include a discovery TLV 1002 described above with respect to FIGS. 10-11.

In the illustrated embodiment, availability attribute 1900 includes an attribute identifier 1910, a length field 1920, a map control field 1950, and an availability intervals indication 1960. The availability attribute 1900 can include additional fields, and fields can be rearranged, removed, and/or resized.

The attribute identifier field 1910 can include a value which identifies the element as the availability attribute 1900. The illustrated attribute identifier field 1910 is one octet long. In some implementations, the attribute identifier field 1910 can be two, five, or twelve octets long. In some implementations, the attribute identifier field 1910 can be of variable length, such as varying length from signal to signal and/or as between service providers.

The length field 1920 can serve to indicate the length of the availability attribute 1900 or the total length of subsequent fields. The illustrated length field 1920 is two octets long. In some implementations, the length field 1920 can be one, five, or twelve octets long. In some implementations, the length field 1920 can be of variable length, such as varying length from signal to signal and/or as between service providers. In some embodiments, a length of zero (or another predetermined token value) can indicate that one or more other fields are not present.

The map control field 1950 can serve to provide information regarding the availability intervals indication 1960. The illustrated map control field 1950 is one octet long. In some implementations, the map control field 1950 can be two, five, or twelve octets long. In some implementations, the map control field 1950 can be of variable length, such as varying length from signal to signal and/or as between service providers. As illustrated, the map control field 1950 includes a four-bit map ID field 1952, a two-bit availability interval duration field 1954, a one-bit repeat flag 1956, and a reserved bit 1958. The map control field 1950 can include additional fields, and fields can be rearranged, removed, and/or resized.

The map ID field 1952 serves to identify the availability intervals indication 1960. The availability interval duration field 1954 serves to indicate the availability interval duration associated with the availability intervals indication 1960. For example, where the availability intervals indication 1960 includes a bitmap of available intervals, an availability interval duration value of 0 can indicate that each bit of the bitmap represents, for example, a 16 ms interval; an availability interval duration value of 1 can indicate that each bit of the bitmap represents, for example, a 32 ms interval, an availability interval duration value of 3 can indicate that each bit of the bitmap represents, for example, a 64 ms interval, etc. The repeat flag 1956 can serve to indicate whether the signaled availability applies only to the next discovery window interval or if the signaled availability repeats for future discovery window intervals until otherwise changed.

The availability intervals 1960 can serve to indicate one or more time intervals during which the transmitting STA is available for one or more of P2P frame exchange, ranging, BSS frames, IBSS frames, mesh networking frames, NAN frames, etc. In some embodiments, the transmitting STA is available for ranging during the window for which it is available for P2P frame exchange. For example, the ranging availability intervals 1960 can include a list of time intervals. In various embodiments, such lists can include strings of device identifiers, compressed lists, bitmaps, bloom filters, and/or other compressed or uncompressed representations.

In one particular embodiment, the ranging availability intervals 1960 can include a bitmap dividing a time between beginnings of consecutive discovery windows in a given neighborhood aware networking (NAN) cluster into, for example, 32 consecutive time intervals of equal durations. Thus, in an embodiment, when the first device 110 sets the first bit in the bitmap, it may indicate that it may be available during the first of the example 32 time intervals, and so on. In an embodiment, when the first device 110 does not set the first bit in the bitmap, it may still be available during the first of the example 32 time intervals, and so on but may not explicitly indicate the same.

Figure 20:
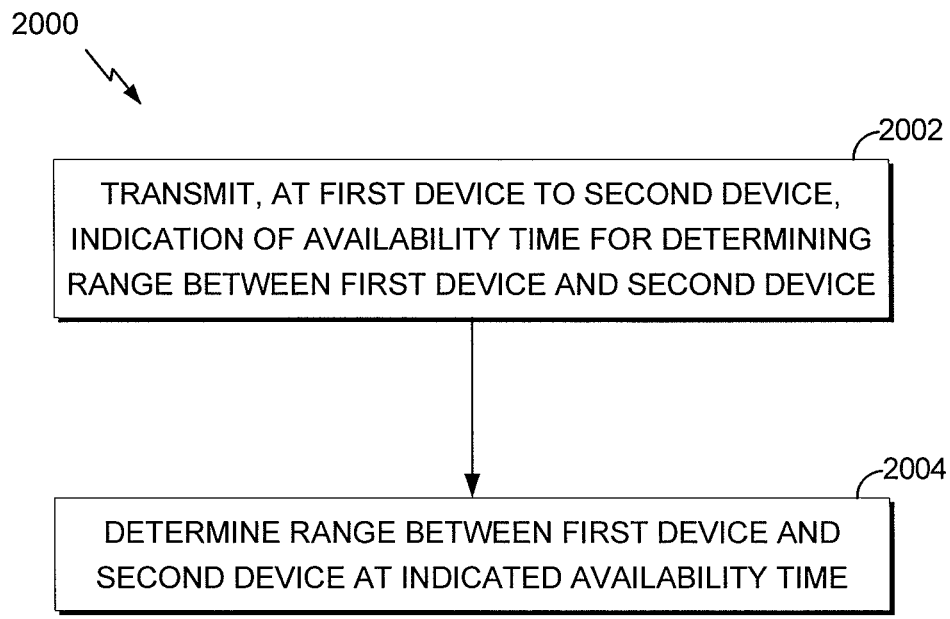
FIG. 20 is a flowchart for an exemplary method of wireless communication that can be employed within the wireless communication system of FIG. 1.

FIG. 20 shows a flowchart 2000 for an exemplary method of wireless communication that can be employed within the wireless communication system 100 of FIG. 1. The method can be implemented in whole or in part by the devices described herein, such as the devices 110 (FIG. 1), 200 (FIG. 1), and/or 900 (FIG. 9). Although the illustrated method is described herein with reference to the wireless communication system 100 described above with respect to FIG. 1, the wireless device 900 described above with respect to FIG. 9, and the timeline 1600 described above with respect to FIG. 16, the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2002, the first device 110 transmits to the second device 120 an indication of an availability time for determining a range between the first device 110 and the second device 120. In some embodiments, the indication may be interpreted as an indication of an availability time for peer-to-peer frame exchange and/or ranging, as described above. For example, the first device 110 can transmit the availability indication 1610 to the second device 120. Thus, in various embodiments, the indication of availability can include one or more of the attributes 1700, 1800, and/or 1900 described above with respect to FIGS. 17-19.

In various embodiments, the indication can include and/or identify a channel identifier and one or more ranging availability intervals. For example, the indication can include the channel number 1854 and availability intervals 1860 described above with respect to FIG. 18. In various embodiments, the first device 110 can emit a bitmap dividing beginnings of consecutive discovery windows into, for example, 32 consecutive time intervals of equal durations. In one embodiment, each bit of the bitmap may identify an availability of a respective one of the availability windows. In various embodiments, indication can include an indication that ranging is mandatory for a particular P2P service. In various embodiments, the indication can include availability for executing a timing measurement protocol. In one embodiment, the timing measurement protocol can be an IEEE 802.11 fine time measurement (FTM) protocol.

Next, at block 2004, the device 900 executes a range determination mechanism (e.g., determines the range between the first device 110 and the second device 120) at the indicated availability time. For example, the first device 110 can perform the ranging operation 1620 with the second device 120 during the availability window (e.g., time period or time window) 1615. Thus, in various embodiments, the range determination mechanism can include one or more of the ranging determination mechanism described herein with respect to FIGS. 3-15.

In various embodiments, the range determination mechanism can be based on a received signal strength indication (RSSI) of a received message, a transmit power level of the received message, a round trip time measurement, a location indication, a comparison of neighboring device lists, or any combination thereof. In various embodiments, the location indication can include a location information type indicating a type of location information and location information comprising one or more of: a global positioning system (GPS)-based or cellular-based coordinate indication, a third-party location indication, a list of devices visible to the first device, a list of received signal strength indications (RSSIs) for devices visible to the first device, and a list of round trip times (RTTs) for devices visible to the first device.

In various embodiments, the device 900 can further execute one or more additional range determination mechanisms when a result of the range determination mechanism does not satisfy a first criterion. For example, the first device 110 can perform hierarchical ranging as described above with respect to FIG. 14.

In various embodiments, the device 900 can further selectively exchange one or more P2P frames during the availability time, based on a result of the range determination. For example, the first device 110 can allow the second device 120 to perform the P2P exchange (e.g., a P2P association) 1630 when the second device 120 is within a threshold range. On the other hand, the first device 110 can disallow the second device 120 from association when the second device 120 is out of range.

In various embodiments, the first device can include a publishing P2P device. In various embodiments, the first device can include a subscribing P2P device.

In an embodiment, the method shown in FIG. 20 can be implemented in a wireless device that can include a transmitting circuit and an executing circuit. A wireless device can have more components than the simplified wireless device described herein. The wireless device described herein includes those components useful for describing some prominent features of implementations within the scope of the claims.

The transmitting circuit can be configured to transmit the indication of an availability time. In an embodiment, the transmitting circuit can be configured to implement at least block 2002 of the flowchart 2000 (FIG. 20). The transmitting circuit can include one or more of the wireless controller 940 (FIG. 9), the transceiver 950 (FIG. 9), and the antenna 942 (FIG. 9). In some implementations, means for transmitting can include the transmitting circuit.

The executing circuit can be configured to execute the range determination mechanism. In an embodiment, the executing circuit can be configured to implement at least blocks block 2004 of the flowchart 2000 (FIG. 20). The executing circuit can include one or more of the location determination module 917 (FIG. 9), the processor 910 (FIG. 9), the memory 932 (FIG. 9), the wireless controller 940 (FIG. 9), the transceiver 950 (FIG. 9), and the antenna 942 (FIG. 9). In some implementations, means for executing can include the executing circuit.

Figure 21:
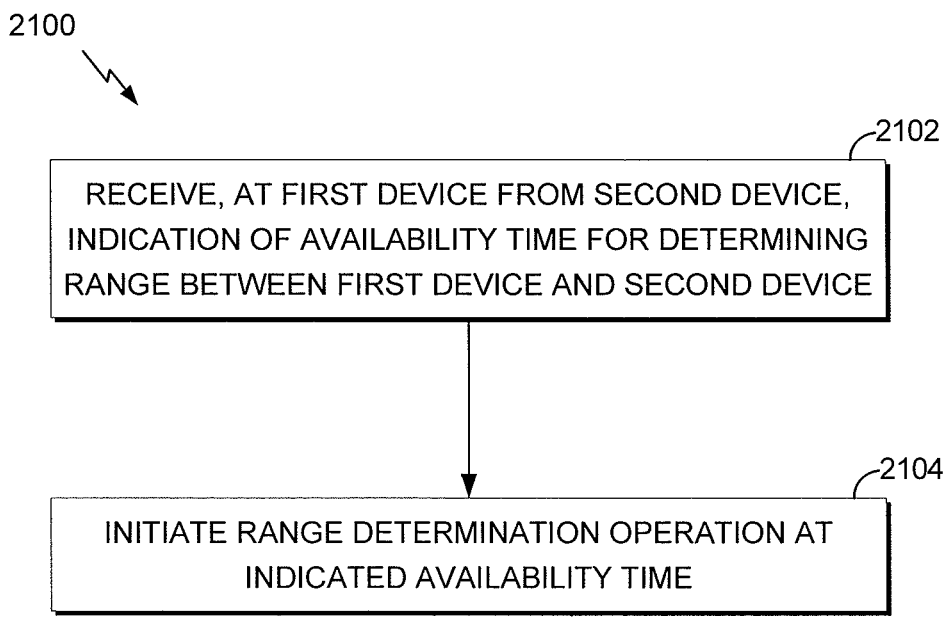
FIG. 21 is a flowchart for an exemplary method of wireless communication that can be employed within the wireless communication system of FIG. 1.

FIG. 21 shows a flowchart 2100 for an exemplary method of wireless communication that can be employed within the wireless communication system 100 of FIG. 1. The method can be implemented in whole or in part by the devices described herein, such as the devices 110 (FIG. 1), 210 (FIG. 1), and/or 900 (FIG. 9). Although the illustrated method is described herein with reference to the wireless communication system 100 described above with respect to FIG. 1, the wireless device 900 described above with respect to FIG. 9, and the timeline 1600 described above with respect to FIG. 16, the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2102, the first device 110 receives from the second device 120 an indication of an availability time for determining a range between the first device 110 and the second device 120. In some embodiments, the indication may be interpreted as an indication of an availability time for peer-to-peer frame exchange and/or ranging, as described above. P2P frame exchange and/or ranging. For example, the second device 110 can receive the availability indication 1610 from the first device 110. Thus, in various embodiments, the indication of availability can include one or more of the attributes 1700, 1800, and/or 1900 described above with respect to FIGS. 17-19.

In various embodiments, the indication can include and/or identify a channel identifier and one or more ranging availability intervals. For example, the indication can include the channel number 1854 and availability intervals 1860 described above with respect to FIG. 18. In various embodiments, the first device 110 can emit a bitmap dividing beginnings of consecutive discovery windows into, for example, 32 consecutive time intervals of equal durations. In one embodiment, each bit of the bitmap may identify an availability of a respective one of the availability windows. In various embodiments, indication can include an indication that ranging is mandatory for a particular P2P service. In various embodiments, the indication can include an availability for executing a timing measurement protocol. In one embodiment, the timing measurement protocol can be an IEEE 802.11 fine time measurement (FTM) protocol.

Next, at block 2104, the device 900 executes a range determination mechanism (e.g., determines the range between the first device 110 and the second device 120) at the indicated availability time. For example, the second device 120 can perform the ranging operation 1620 with the second device 110 during the availability window (e.g., time period, time window, availability window, or availability time) 1615. Thus, in various embodiments, the range determination mechanism can include one or more of the ranging determination mechanism described herein with respect to FIGS. 3-15.

In various embodiments, the range determination mechanism can be based on a received signal strength indication (RSSI) of a received message, a transmit power level of the received message, a round trip time measurement, a location indication, a comparison of neighboring device lists, or any combination thereof. In various embodiments, the location indication can include a location information type indicating a type of location information and location information comprising one or more of: a global positioning system (GPS)-based or cellular-based coordinate indication, a third-party location indication, a list of devices visible to the first device, a list of received signal strength indications (RSSIs) for devices visible to the first device, and a list of round trip times (RTTs) for devices visible to the first device.

In various embodiments, the device 900 can further execute one or more additional range determination mechanisms when a result of the range determination mechanism does not satisfy a first criterion. For example, the second device 120 can perform hierarchical ranging as described above with respect to FIG. 14.

In various embodiments, the device 900 can further selectively exchange one or more P2P frames during the availability time, based on a result of the range determination. For example, the first device 110 can allow the second device 120 to perform a P2P exchange (e.g., a P2P association) 1630 when the second device 120 is within a threshold range. On the other hand, the first device 110 can disallow the second device 120 from association when the second device 120 is out of range.

In various embodiments, the first device can include a publishing P2P device. In various embodiments, the first device can include a subscribing P2P device.

In an embodiment, the method shown in FIG. 21 can be implemented in a wireless device that can include a receiving circuit and an executing circuit. A wireless device can have more components than the simplified wireless device described herein. The wireless device described herein includes those components useful for describing some prominent features of implementations within the scope of the claims.

The receiving circuit can be configured to receive the indication of an availability time. In an embodiment, the receiving circuit can be configured to implement at least block 2102 of the flowchart 2100 (FIG. 21). The receiving circuit can include one or more of the wireless controller 940 (FIG. 9), the transceiver 950 (FIG. 9), and the antenna 942 (FIG. 9). In some implementations, means for receiving can include the receiving circuit.

The executing circuit can be configured to execute the range determination mechanism. In an embodiment, the executing circuit can be configured to implement at least blocks block 2104 of the flowchart 2100 (FIG. 21). The executing circuit can include one or more of the location determination module 917 (FIG. 9), the processor 910 (FIG. 9), the memory 932 (FIG. 9), the wireless controller 940 (FIG. 9), the transceiver 950 (FIG. 9), and the antenna 942 (FIG. 9). In some implementations, means for executing can include the executing circuit.

The various illustrative logical blocks, configurations, modules, circuits, and algorithm steps described in connection with the embodiments disclosed herein can be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The steps of a method or algorithm described in connection with the embodiments disclosed herein can be embodied directly in hardware, in a software module executed by a processor, or in a combination of the two. A software module can reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium can be integral to the processor. The processor and the storage medium can reside in an application-specific integrated circuit (ASIC). The ASIC can reside in a computing device or a user terminal (e.g., a mobile phone or a PDA). In the alternative, the processor and the storage medium can reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein can be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method of wireless communication, comprising:
    transmitting a message from a first device to a second device, the message comprising first data indicative of a time window that the first device is available for determining a range between the first device and the second device, second data indicative of a channel for the first device to determine the range, and third data indicative of a range threshold, wherein the message further includes a channel identifier associated with the channel and further includes multiple time window intervals for determining the range for wireless communication between the first device and the second device;
    determining, during the indicated time window, the range between the first device and the second device, the determination of the range being performed only during the indicated time window; and
    emitting a bitmap dividing beginnings of each of the multiple time window intervals into a plurality of consecutive time window intervals of equal durations, each bit of the bitmap identifying an availability of a respective indication of the time window.

2. The method of claim 1, further comprising exchanging one or more peer-to-peer data frames during the indicated time window based on a result of the range determination.

3. The method of claim 2, wherein the first device comprises a publishing peer-to-peer device and the second device comprises a subscribing peer-to-peer device.

4. The method of claim 2, wherein the first device comprises a subscribing peer-to-peer device and the second device comprises a publishing peer-to-peer device.

5. The method of claim 2, wherein the message further includes mandating the determining the range for a peer-to-peer service.

6. The method of claim 1, wherein the range determination is at least based on a received signal strength indication of the message, a transmit power level of the message, a round trip time measurement between the first device and the second device, a location indication of the first device, a comparison of neighboring device lists associated with the first and second devices, or any combination thereof.

7. The method of claim 6, wherein the location indication of the first device comprises location information comprising one or more of: a location information type, a location coordinate indication derived based on a global-positioning-system, a cellular communication system, or a third-party location indication, a list of devices detectable by the first device, a list of received signal strength indications for devices detectable by the first device, and a list of round trip times for devices detectable by the first device.

8. The method of claim 1, wherein the message comprises availability for one or more of the first device and the second device to execute a timing measurement protocol.

9. The method of claim 1, further comprising:
    determining whether a result of the range determination satisfies a criterion; and
    determining, when the result of the range determination does not satisfy the criterion, at least one additional ranges, wherein the at least one additional range is at least one of between the first device and the second device, and between the first device and one or more other devices.

10. The method of claim 1, wherein determining the range between the first device and the second device comprises a process of triangulation and trilateration, the triangulation and trilateration process comprising:
  determining a range between: (1) the first device and a third device and (2) the first device and a fourth device;
  determining a range between: (3) the second device and the third device, (4) the second device and the fourth device, and (5) the third device and the fourth device;
  receiving, from each of the second, third, and fourth devices, respectively, a range between: (6) the second device and a fifth device, (7) the third device and the fifth device, and (8) the fourth device and the fifth device; and
  determining a range between the first device and the fifth device based on the range between the first device and the second device and each of the ranges (1)-(8).

11. The method of claim 1, further comprising:
  receiving a discovery frame;
  determining a Range Signal Strength Indicator (RSSI) of the discovery frame; and
  decoding the discovery frame in response to the RSSI being greater than a threshold.

12. The method of claim 1, further comprising:
  comparing the determined range with the range threshold; and
  determining whether to discard or decode the message based in part on the comparison.

13. An apparatus configured to communicate in a wireless network, comprising:
  a transmitter configured to transmit a message from the apparatus to a wireless device, the message comprising first data indicative of a time window that the apparatus is available for determining a range between the apparatus and the wireless device, second data indicative of a channel for the apparatus to determine the range, and third data indicative of a range threshold, wherein the message further includes a channel identifier associated with the channel and further includes multiple time window intervals for determining the range for wireless communication between the apparatus and the wireless device, and
  a processor configured to:
    determine during the indicated time window, the range between the apparatus and the wireless device, the determination of the range being performed only during the indicated time window, and
    emit a bitmap dividing beginnings of each of the multiple time window intervals into a plurality of consecutive time window intervals of equal durations, each bit of the bitmap identifying an availability of a respective indication of the time window.

14. The apparatus of claim 13, wherein the processor is further configured to exchange one or more peer-to-peer data frames during the indicated time window based on a result of the range determination.

15. The apparatus of claim 14, wherein the transmitter comprises a publishing peer-to-peer device and the receiver comprises a subscribing peer-to-peer device.

16. The apparatus of claim 14, wherein the transmitter comprises a subscribing peer-to-peer device and the receiver comprises a publishing peer-to-peer device.

17. The apparatus of claim 13, the processor being further configured to:
  compare the determined range with the range threshold, and
  determine whether to discard or decode the message based in part on the comparison.

18. A method of wireless communication, comprising:
  receiving a message from a first device at a second device, the message comprising first data indicative of a time window that the first device is available for determining a range between the first device and a second device, second data indicative of a channel for the first device to determine the range, and third data indicative of a range threshold, wherein the message indication further includes a channel identifier associated with the channel and further includes multiple time window intervals for performing the range determination operation between the first device and the second device;
  initiating, during the indicated time window, the range determination between the first device and the second device, the determination of the range being performed only during the indicated time window; and
  emitting a bitmap dividing beginnings of each of the multiple time window intervals into a plurality of consecutive time window intervals of equal durations, each bit of the bitmap identifying an availability of a respective indication of the time window.

19. The method of claim 18, further comprising exchanging one or more peer-to-peer data frames during the indicated time window based on a result of the range determination.

20. The method of claim 19, wherein the first device comprises a publishing peer-to-peer device and the second device comprises a subscribing peer-to-peer device.

21. The method of claim 19, wherein the first device comprises a subscribing peer-to-peer device and the second device comprises a publishing peer-to-peer device.

22. The method of claim 19, wherein the message further includes mandating the range determination for a peer-to-peer service.

23. The method of claim 19, further comprising:
  determining whether a result of the range determination operation satisfies a criterion; and
  initiating, when the result of the range determination does not satisfy the criterion, at least one additional range determination operation, wherein the at least one additional range determination operation is at least one of between the first device and the second device, and between the first device and one or more other devices.

24. The method of claim 18, wherein the range determination is at least based on a received signal strength indication of the message, a transmit power level of the message, a round trip time measurement between the first device and the second device, a location indication of the first device, a comparison of neighboring device lists associated with the first and second devices, or any combination thereof.

25. The method of claim 24, wherein the location indication of the first device comprises location information comprising one or more of: a location information type, a location coordinate indication derived based on a global-positioning-system, a cellular communication system, or a third-party location indication, a list of devices detectable by the first device, a list of received signal strength indications for devices detectable by the first device, and a list of round trip times for devices detectable by the first device.

26. The method of claim 18, wherein the message comprises availability for one or more of the first device and the second device to execute a timing measurement protocol.

27. The method of claim 18, further comprising:
  comparing the determined range with the range threshold; and determining whether to discard or decode the message based in part on the comparison.

28. An apparatus configured to communicate in a wireless network, comprising:
- a receiver configured to receive a message from a first device, the message comprising first data indicative of a time window that the first device is available for determining a range between the apparatus and the first device, second data indicative of a channel for the first device to determine the range and third data indicative of a range threshold, wherein the message indication further includes a channel identifier associated with the channel and further includes multiple time window intervals for performing the range determination operation between the first device and the second device;
- a processor configured to:
  - initiate, during the indicated time window, the range determination between the first device and the second device, the determination of the range being performed only during the indicated time window, and
  - emit a bitmap dividing beginnings of each of the multiple time window intervals into a plurality of consecutive time window intervals of equal durations, each bit of the bitmap identifying an availability of a respective indication of the time window.

29. The apparatus of claim 28, wherein the processor is further configured to exchange one or more peer-to-peer data frames during the indicated time window based on a result of the range determination.

30. The apparatus of claim 29, wherein:
- the transmitter comprises a publishing peer-to-peer device and the receiver comprises a subscribing peer-to-peer device; or
- the transmitter comprises a subscribing peer-to-peer device and the receiver comprises a publishing peer-to-peer device.

31. The apparatus of claim 28, the processor being further configured to:
- compare the determined range with the range threshold, and
- determine whether to discard or decode the message based in part on the comparison.

* * * * *